(12) United States Patent
Golton et al.

(10) Patent No.: US 11,911,684 B2
(45) Date of Patent: Feb. 27, 2024

(54) SYSTEMS AND METHODS FOR RESOLVING DISCREPANCIES BETWEEN RECORDINGS OF GAME EVENTS

(71) Applicant: Designated Hitter, Inc, San Carlos, CA (US)

(72) Inventors: Joseph Fisher Golton, Richmond, CA (US); John David McLellan, II, San Carlos, CA (US)

(73) Assignee: DESIGNATED HITTER, INC, San Carlos, CA (US)

( * ) Notice: Subject to any disclaimer, the term of this patent is extended or adjusted under 35 U.S.C. 154(b) by 13 days.

(21) Appl. No.: 17/686,668

(22) Filed: Mar. 4, 2022

(65) Prior Publication Data

US 2022/0331684 A1 Oct. 20, 2022

Related U.S. Application Data

(63) Continuation of application No. 16/697,106, filed on Nov. 26, 2019, now Pat. No. 11,273,359.

(60) Provisional application No. 62/771,584, filed on Nov. 27, 2018.

(51) Int. Cl.
*A63B 71/06* (2006.01)
*G06V 20/40* (2022.01)
*A63B 102/18* (2015.01)

(52) U.S. Cl.
CPC .......... *A63B 71/0669* (2013.01); *G06V 20/42* (2022.01); *A63B 2102/18* (2015.10)

(58) Field of Classification Search
None
See application file for complete search history.

(56) References Cited

U.S. PATENT DOCUMENTS

| | | | | |
|---|---|---|---|---|
| 6,041,266 | A * | 3/2000 | Nickerson | G06F 15/025 463/3 |
| 2014/0288683 | A1* | 9/2014 | Sullivan | H04N 21/8126 700/92 |
| 2016/0008695 | A1* | 1/2016 | Aman | G07C 1/28 348/157 |
| 2016/0346690 | A1* | 12/2016 | Ramachandran | A63F 13/34 |
| 2018/0280783 | A1* | 10/2018 | Gordon | G06F 3/0488 |

* cited by examiner

*Primary Examiner* — Ronald Laneau
(74) *Attorney, Agent, or Firm* — Yong Chen; Lin Sun-Hoffman; Liu Chen & Hoffman LLP

(57) ABSTRACT

Systems and methods for resolving discrepancies between recordings made by multiple scorekeepers for a game comprising discrete events. In an example, a discrepancy resolving system include at least two personal computing devices and a remote server connected thereto, wherein each of the personal computing devices and the server is equipped with software which enables the personal computing devices to receive recordings of game events from a different scorekeeper, sending such recordings to the server, where the recordings from different scorekeepers are compared and discrepancies detected. The discrepancies are sent back to the computing devices for further responses from the scorekeepers. When the responses from different scorekeepers agree with each other, the discrepancies are resolved. When all scorekeepers resolve all discrepancies and agree that the game is over and all game events have been recorded, all versions of game event recordings are identical, and can be merged into one completed, official, scorekeeping record.

6 Claims, 31 Drawing Sheets

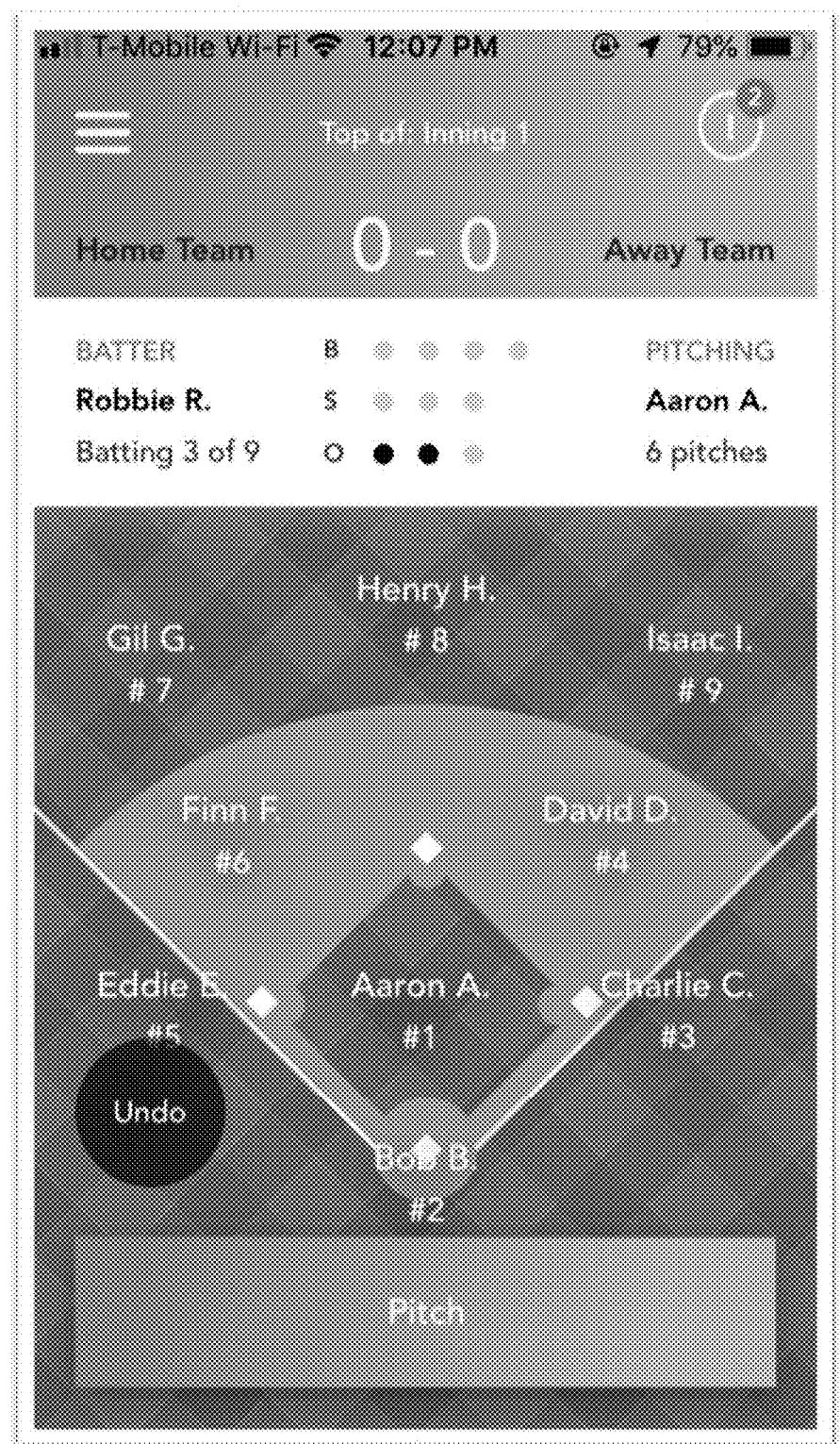
FIG. 2.1

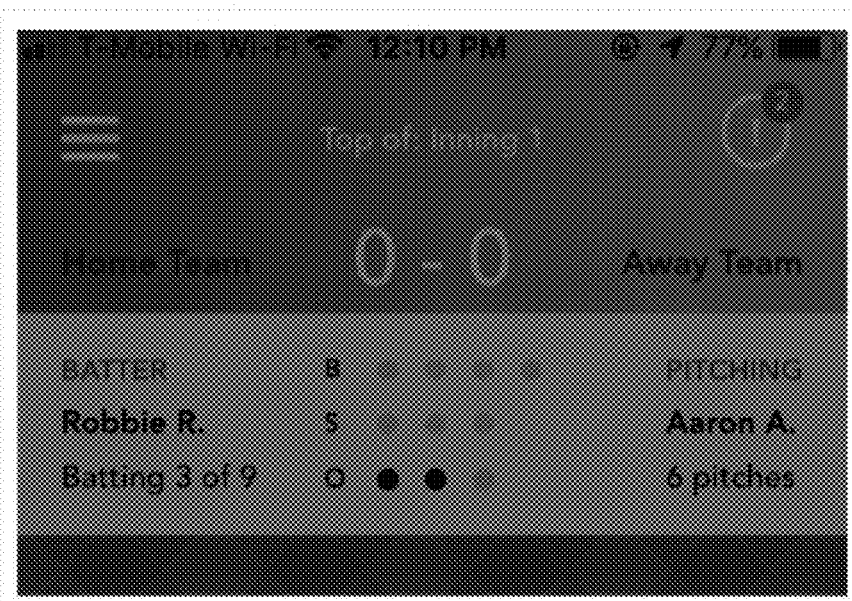
FIG. 2.2

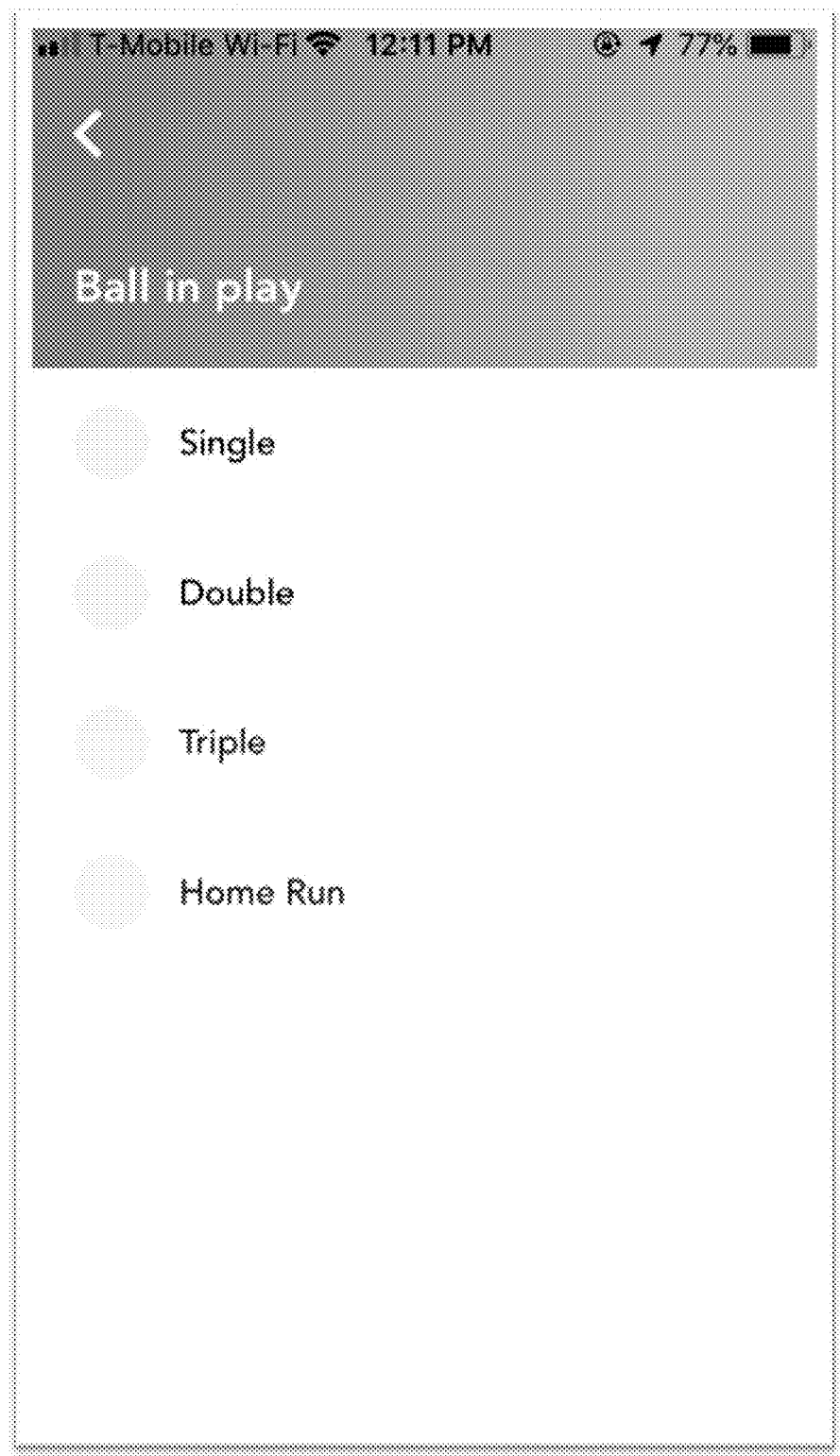
FIG. 2.3

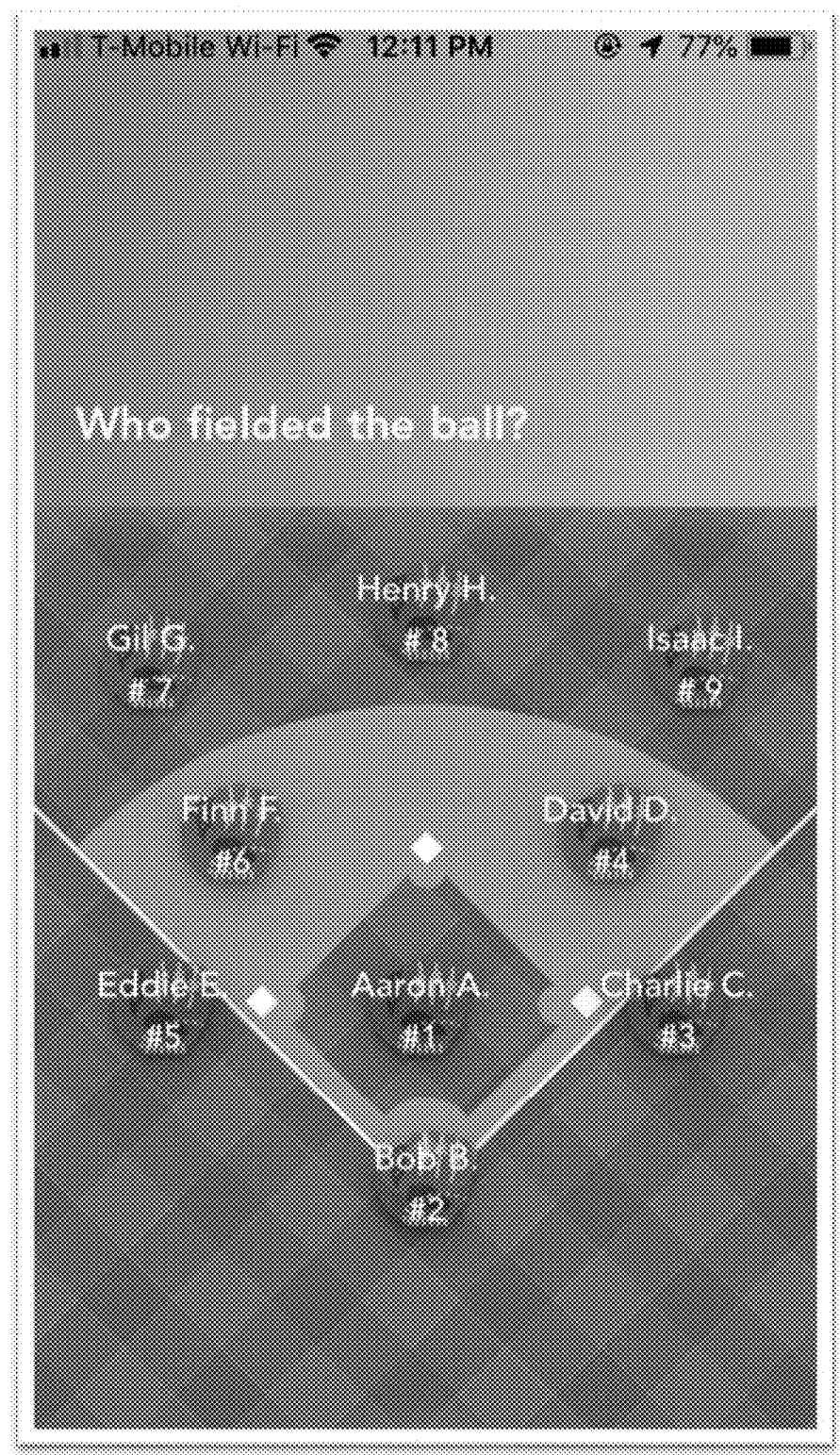
FIG. 2.4

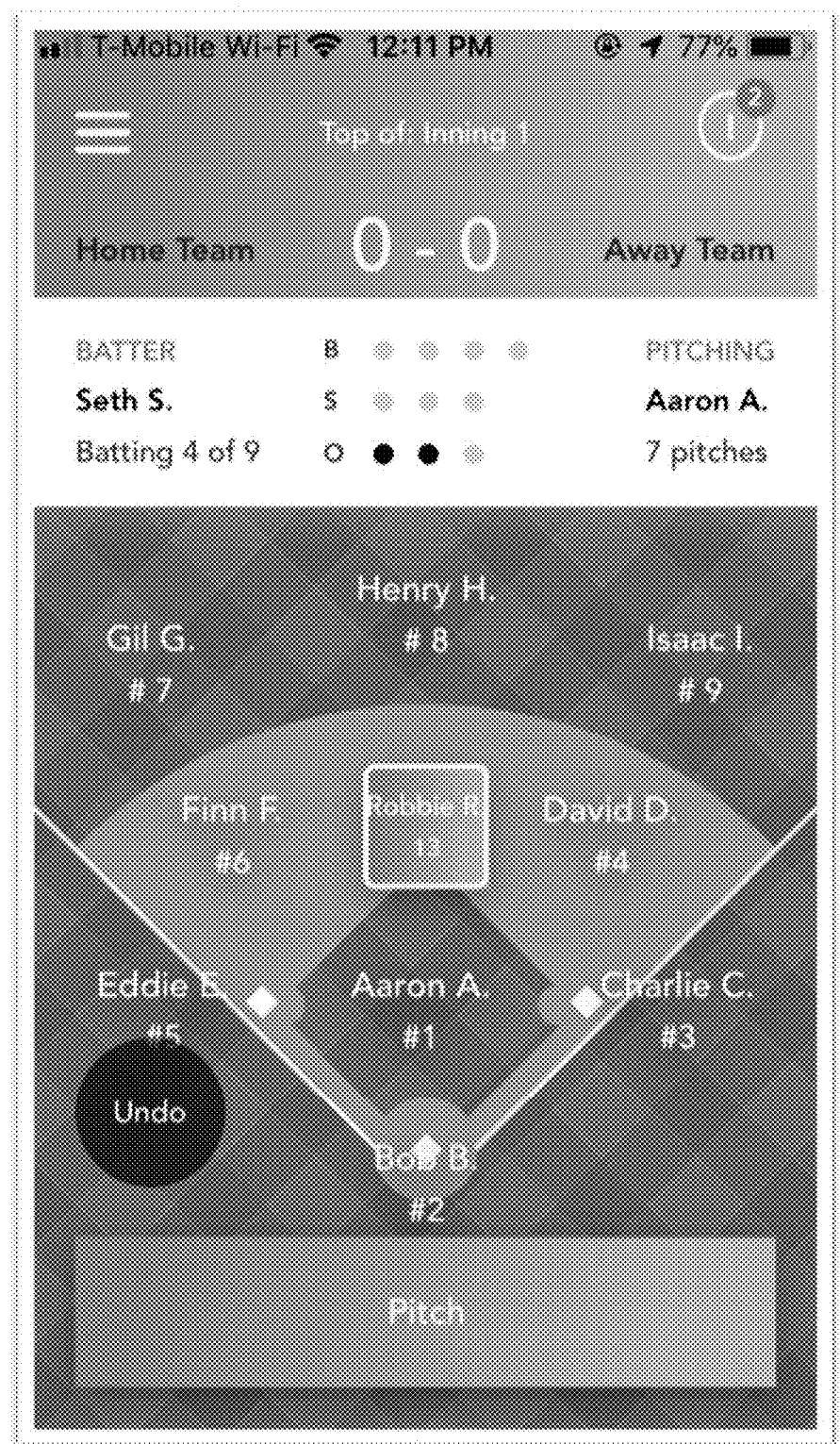
FIG. 2.5

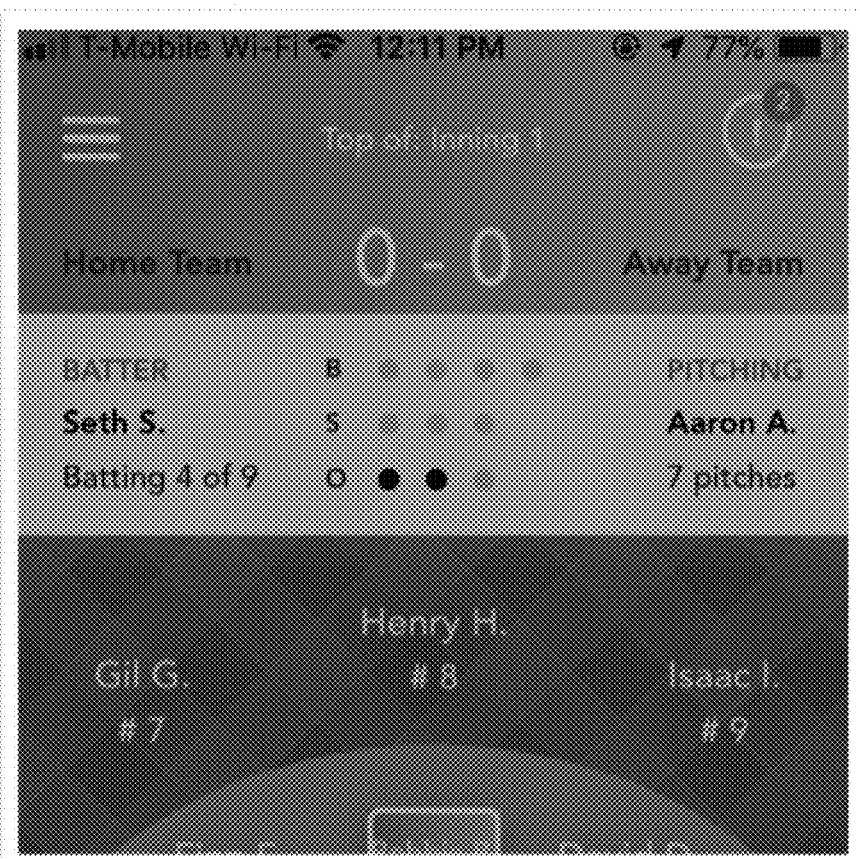
FIG. 2.6

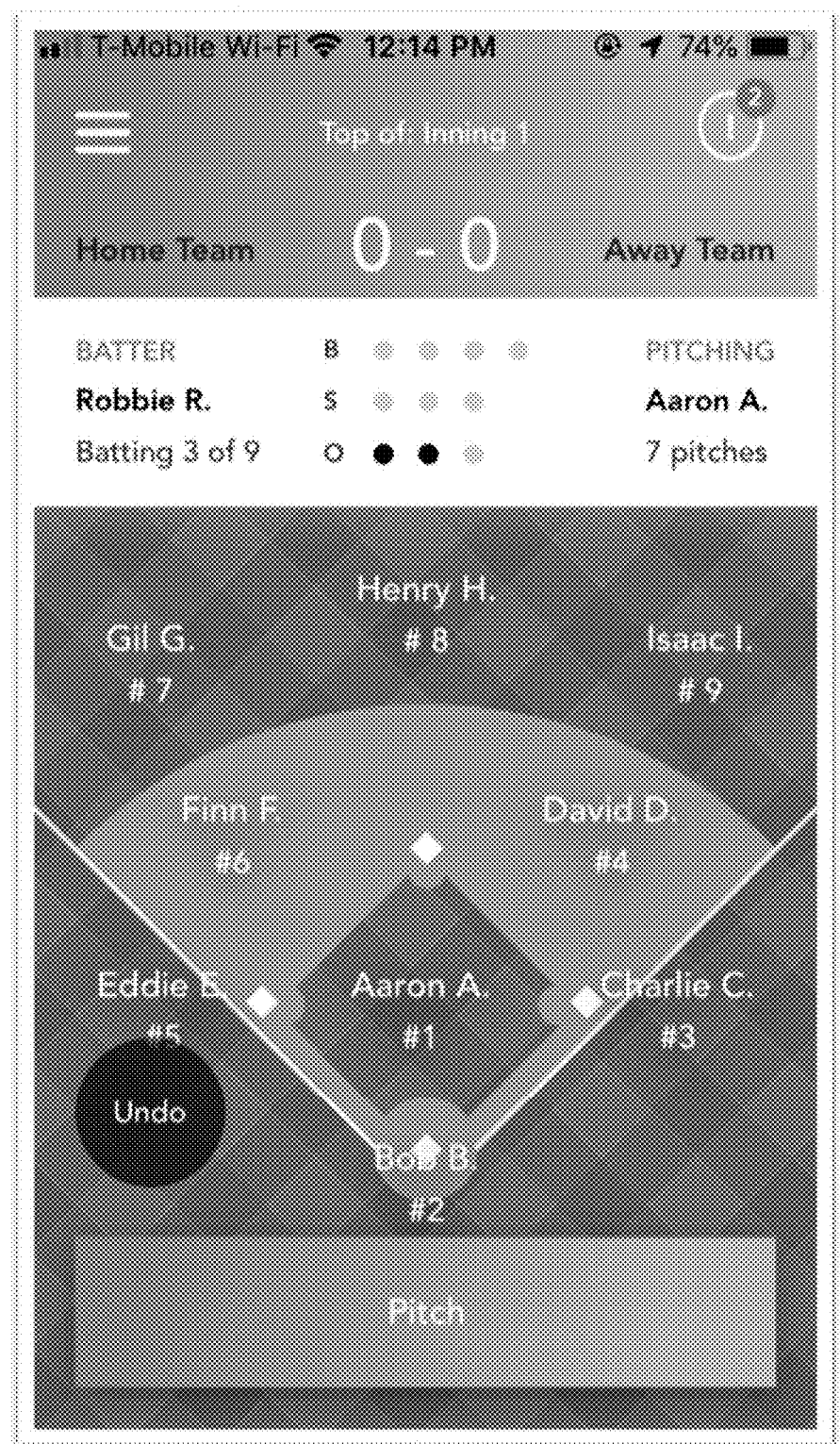
FIG. 2.7

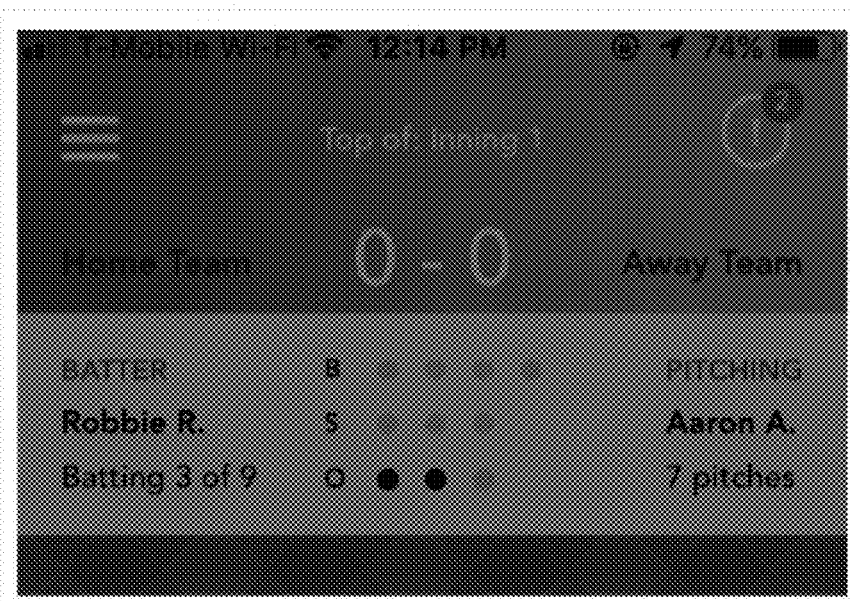
FIG. 2.8

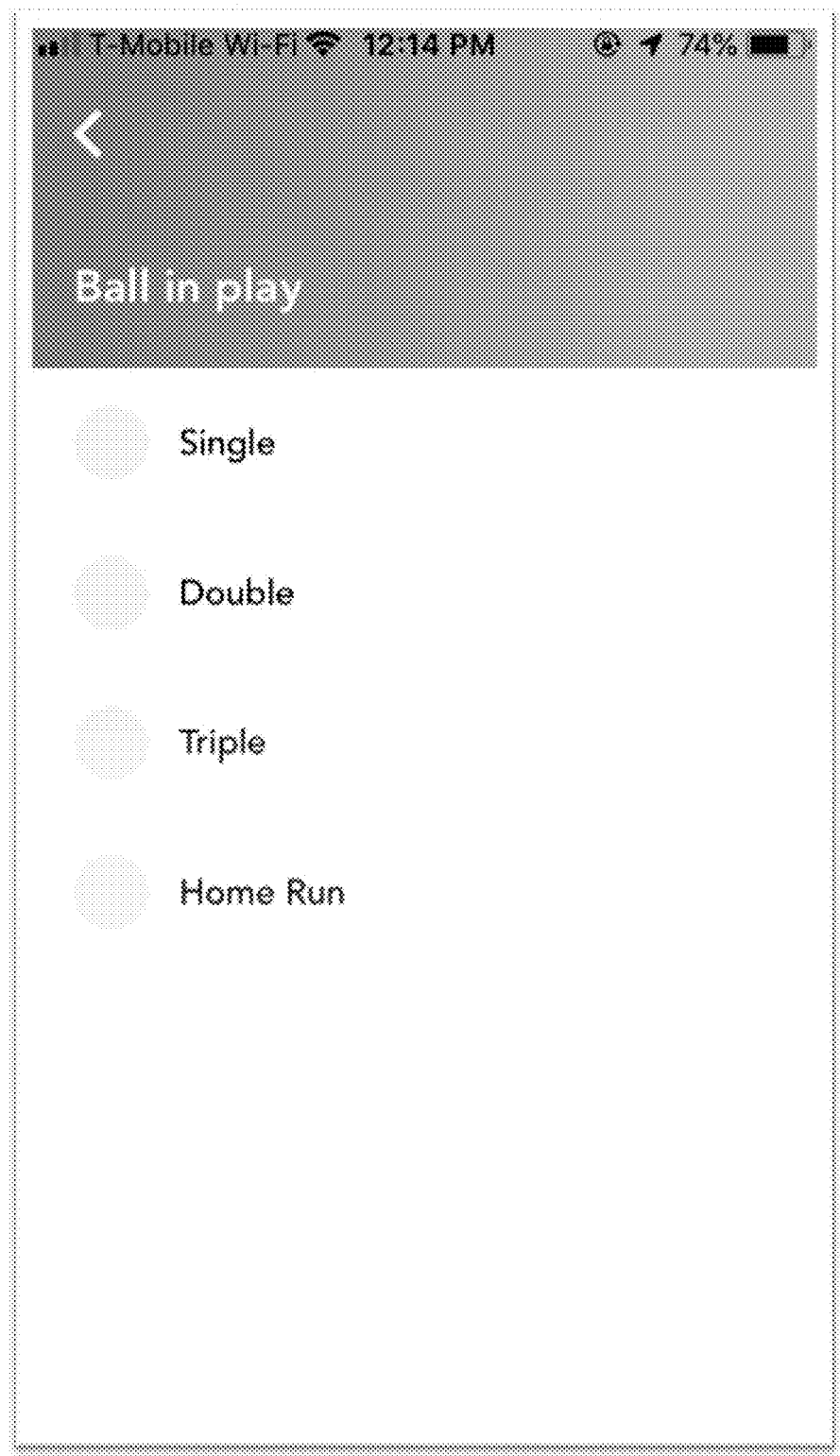
FIG. 2.9

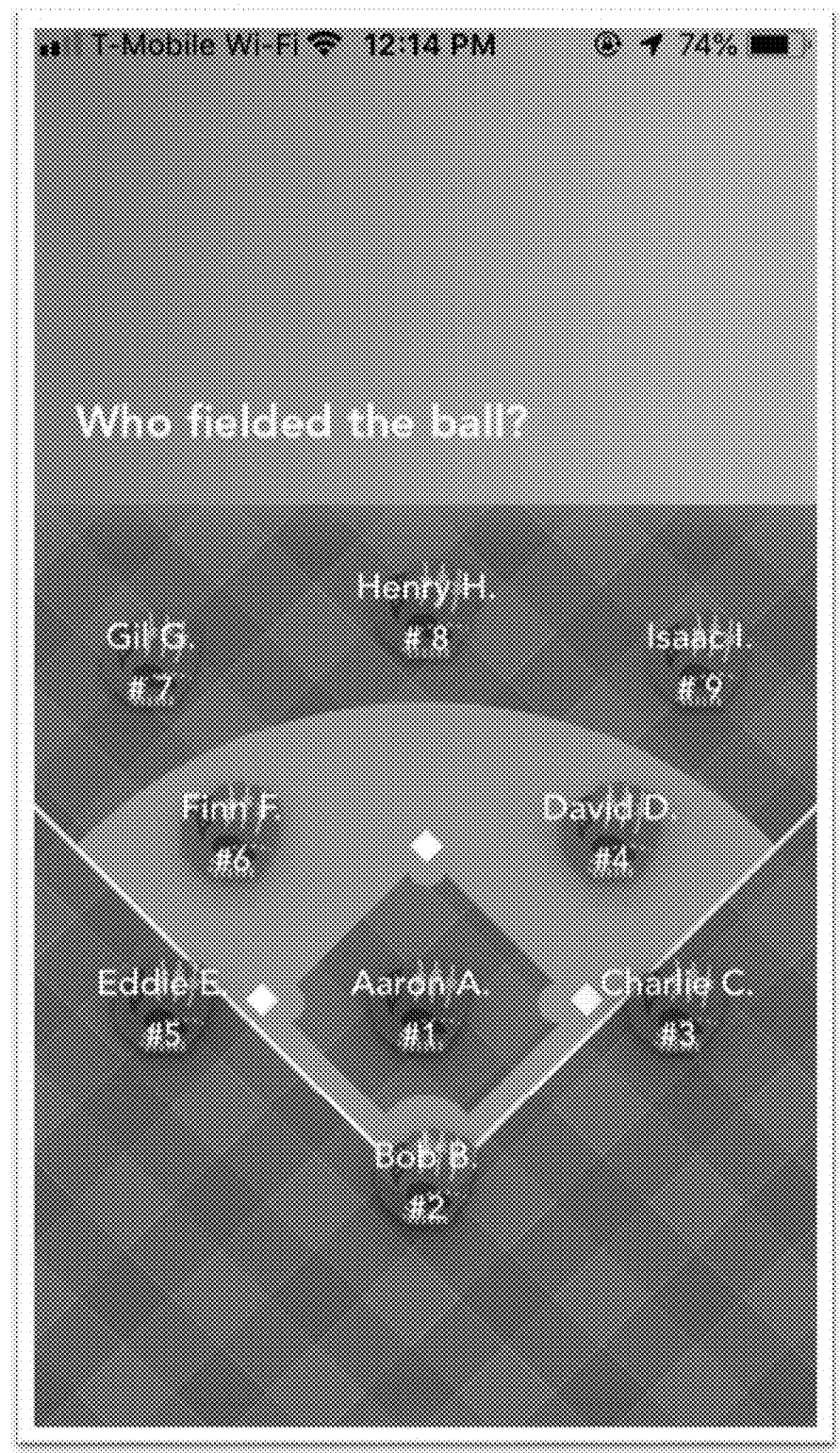
FIG. 2.10

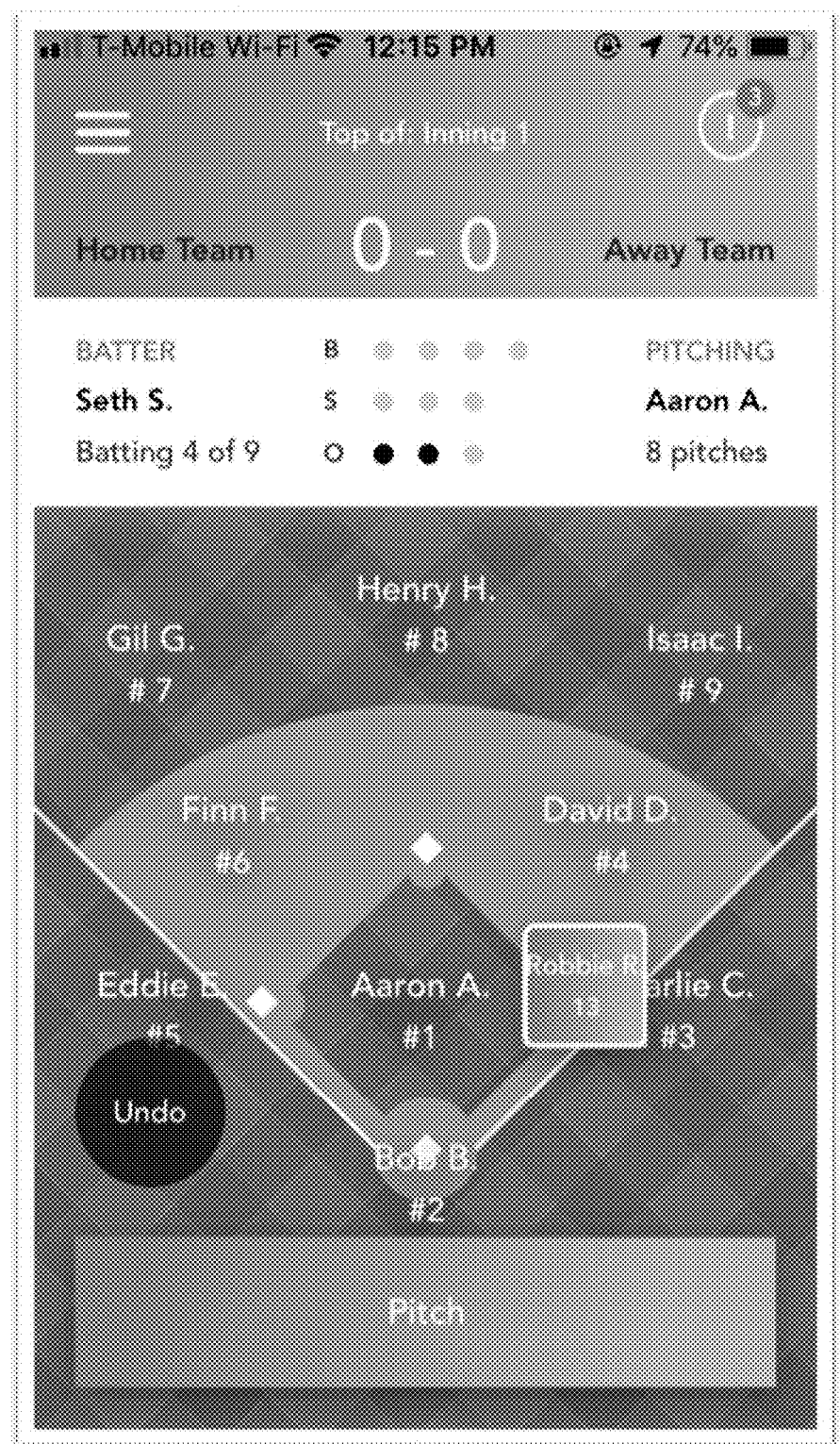
FIG. 2.11

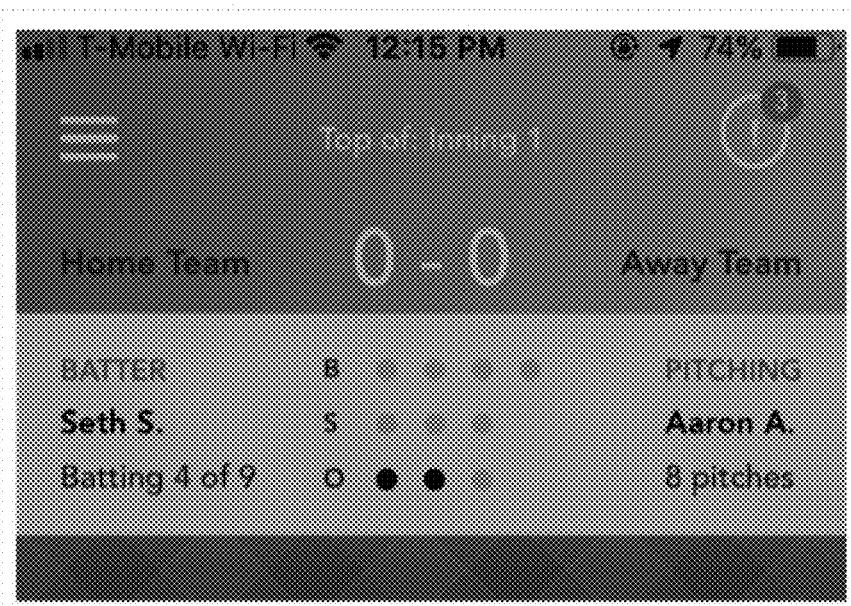
FIG. 2.12

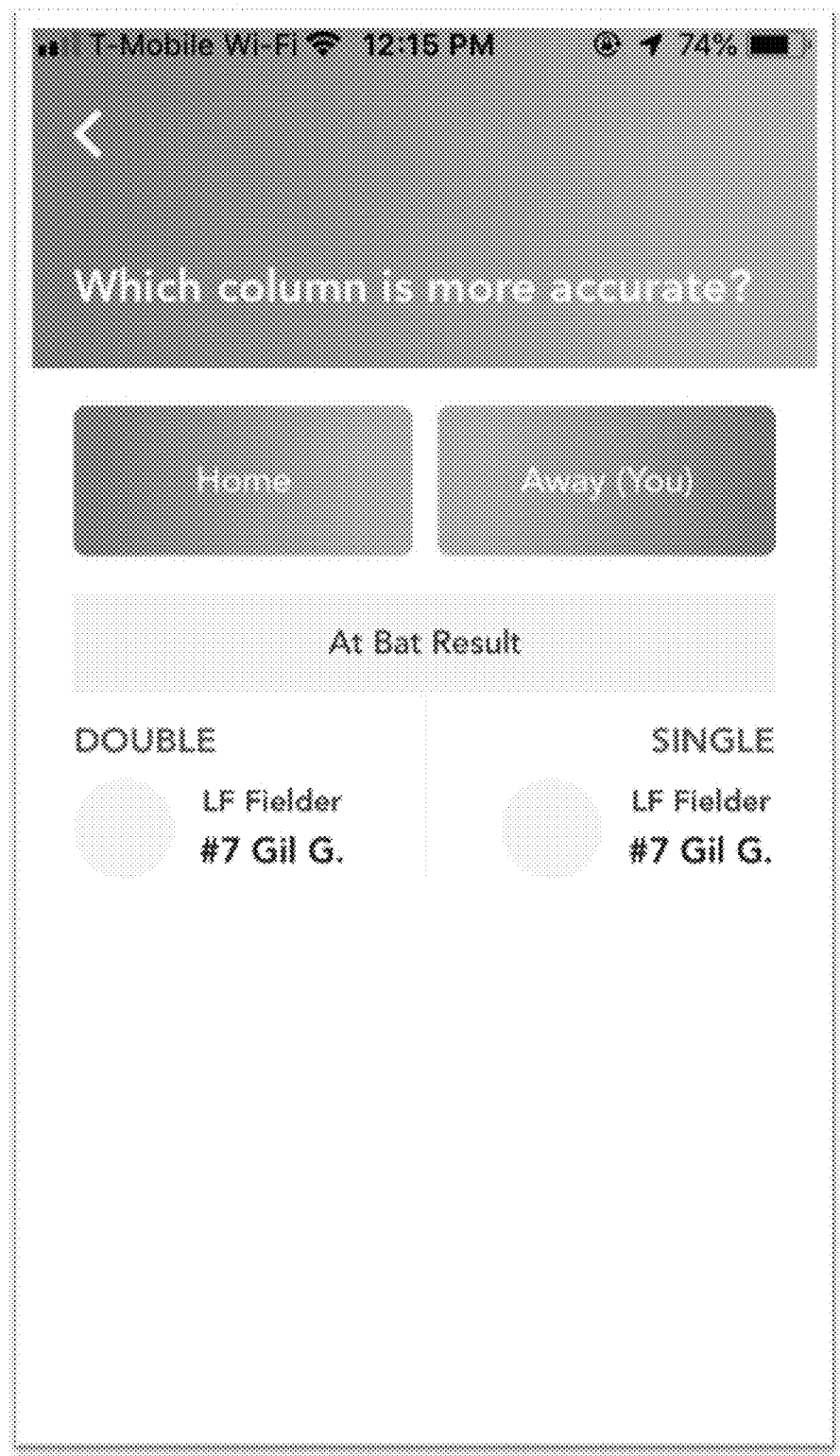
FIG. 2.13

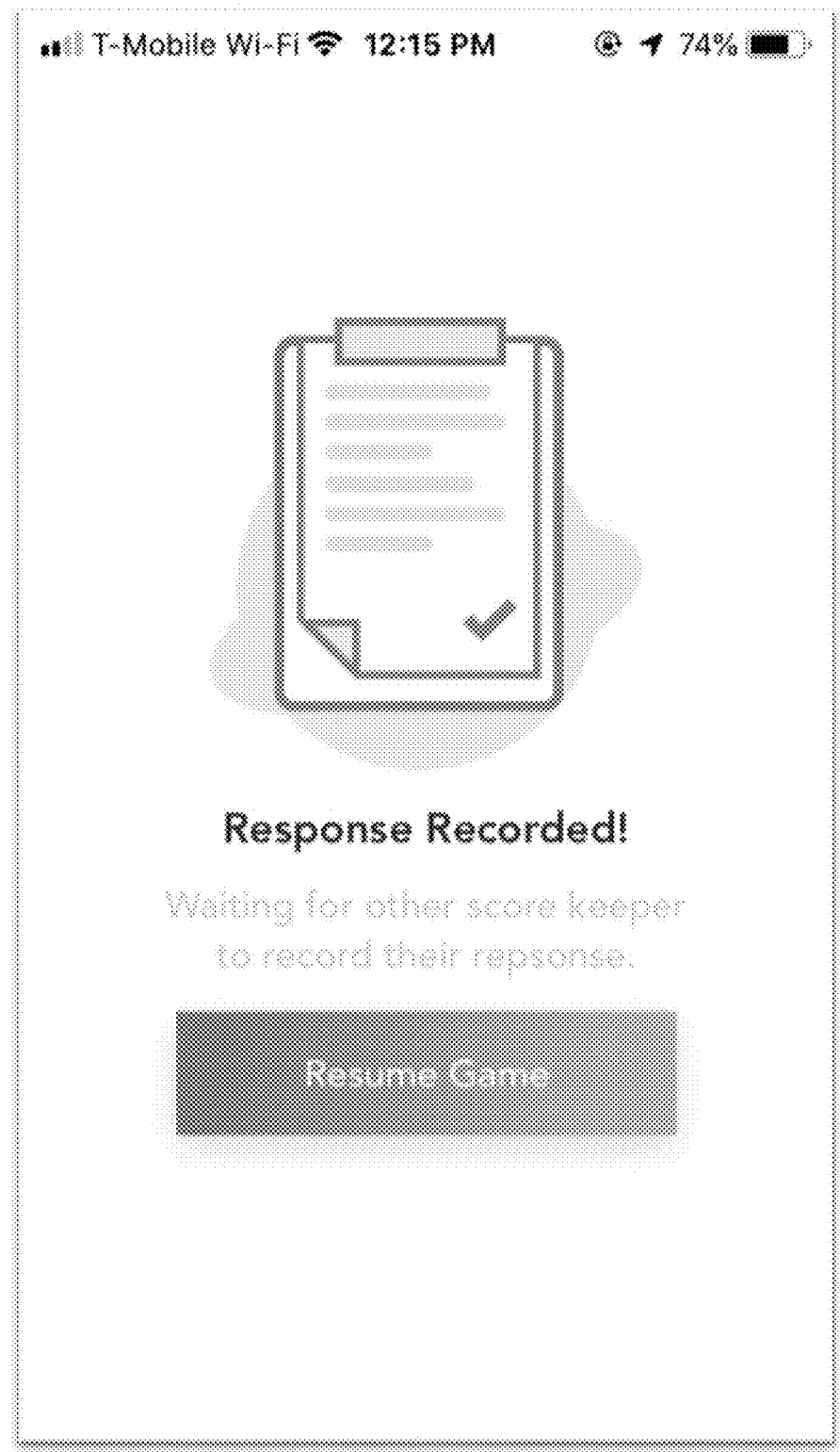
FIG. 2.14

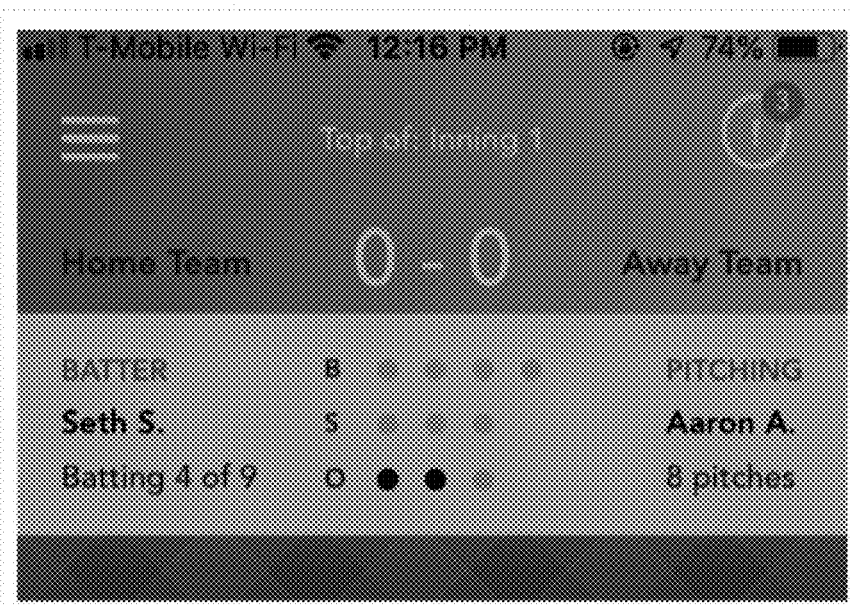
FIG. 2.15

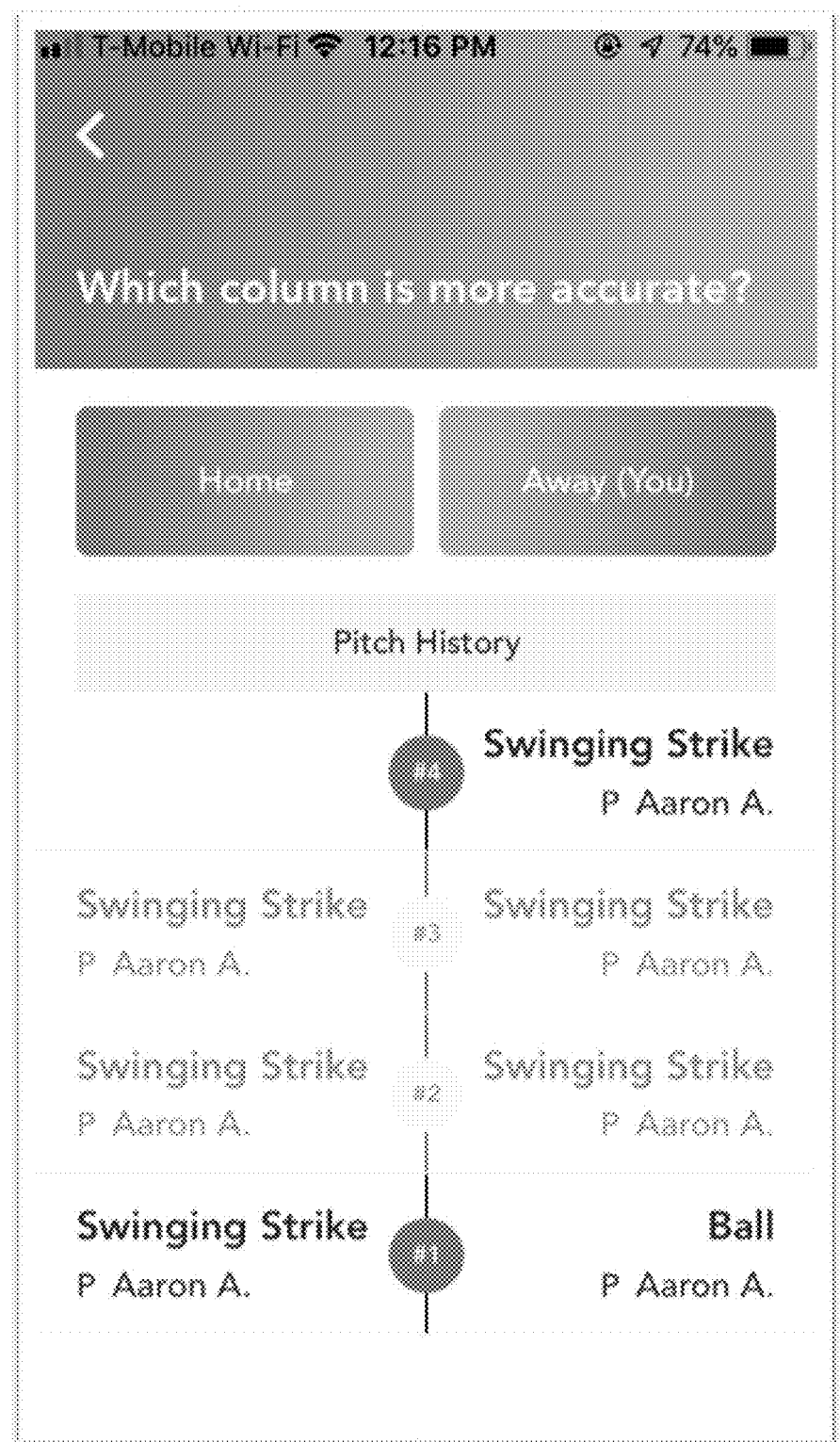
FIG. 2.16

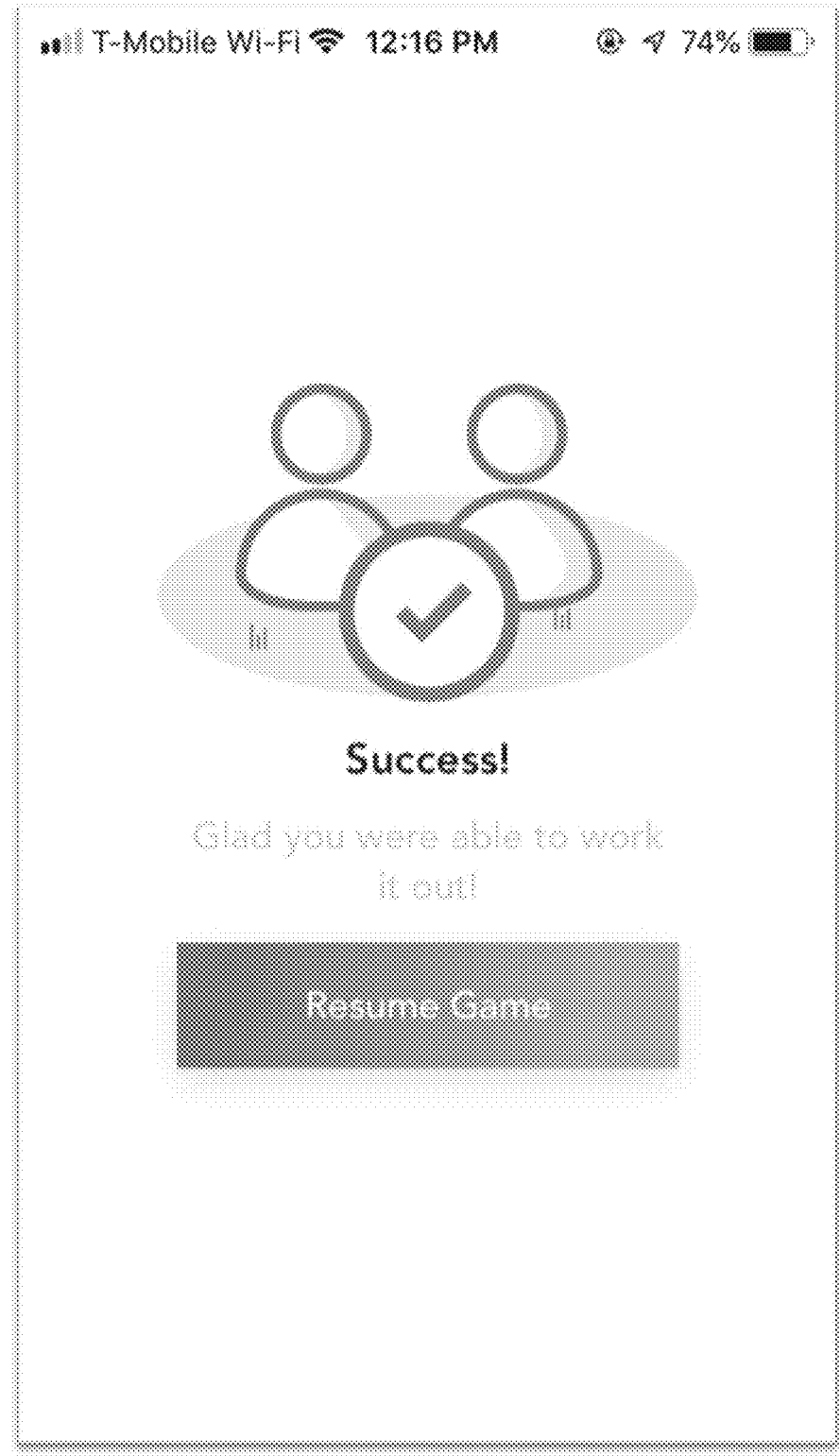
FIG. 2.17

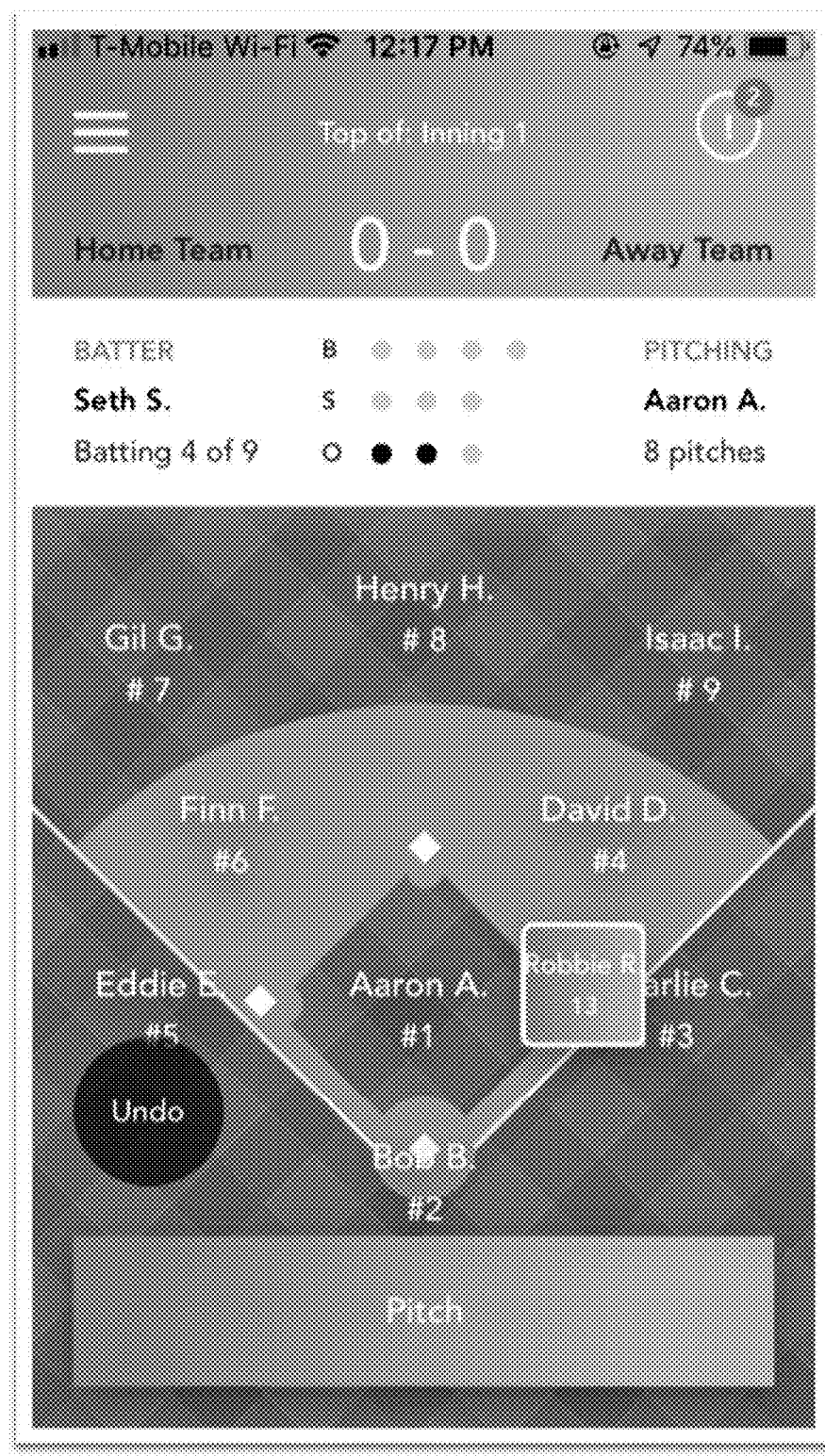
FIG. 2.18

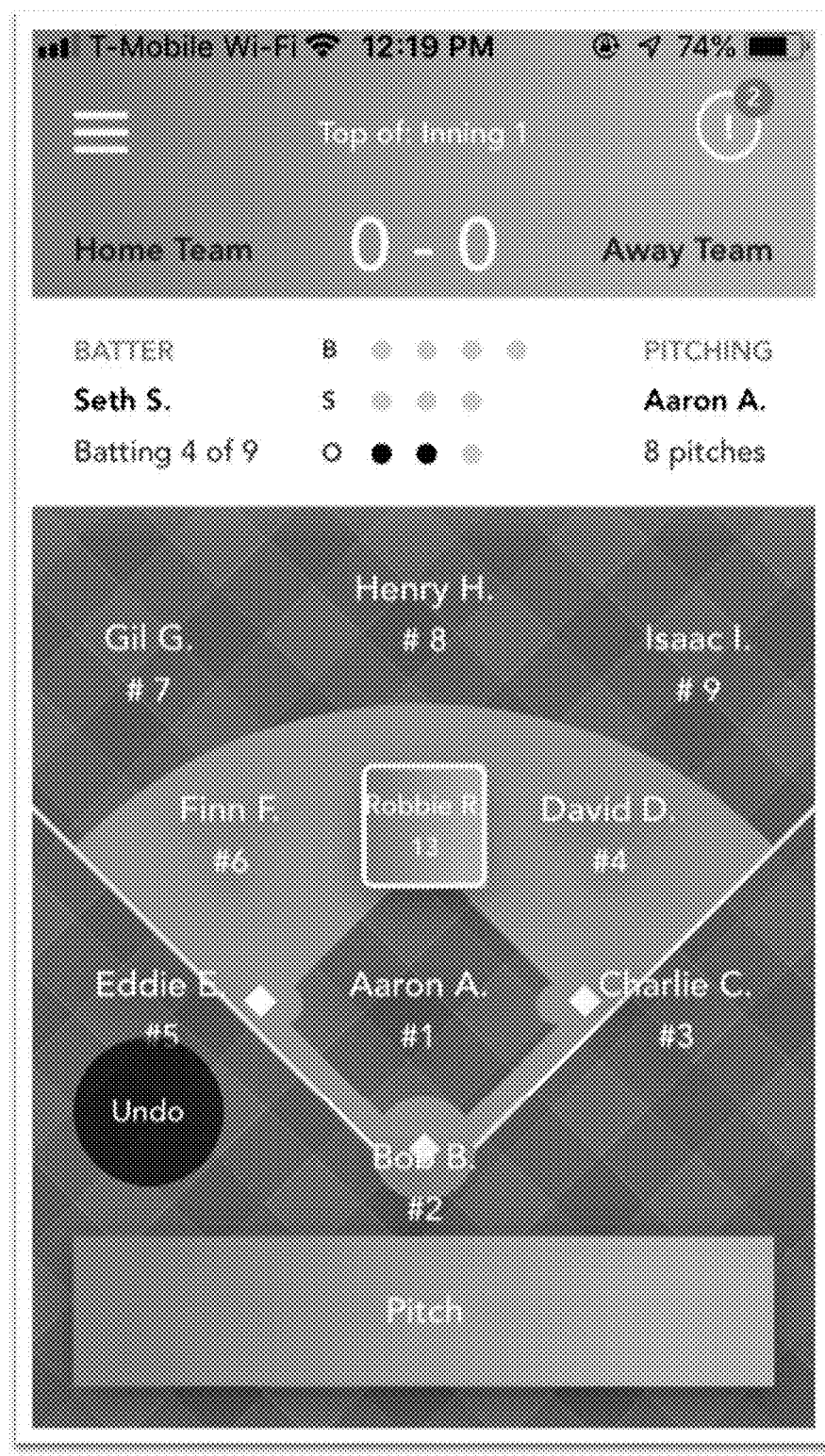
FIG. 2.19

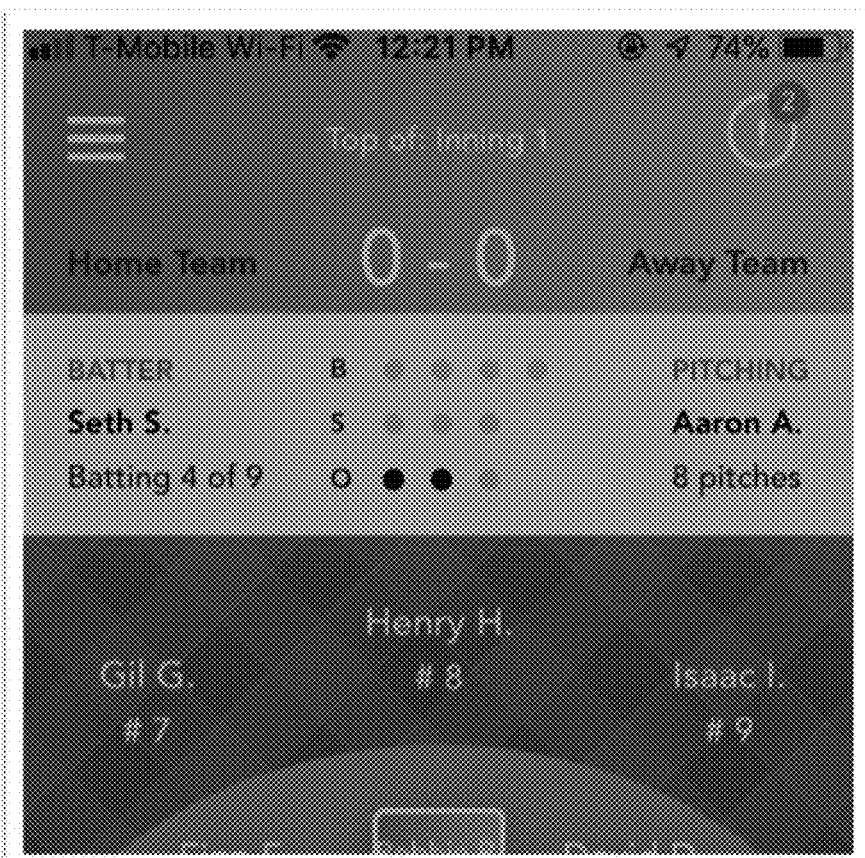
FIG. 2.20

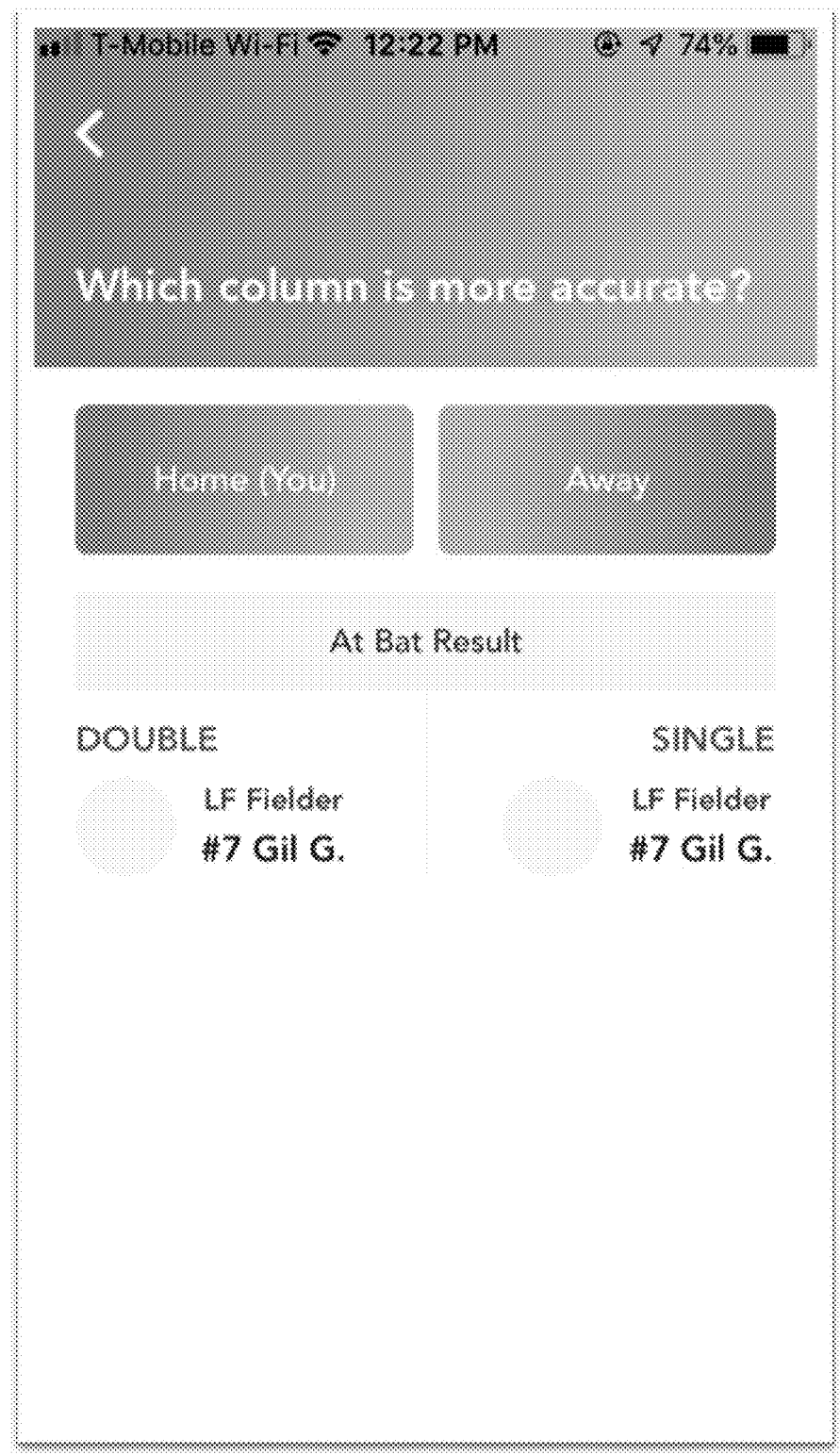
FIG. 2.21

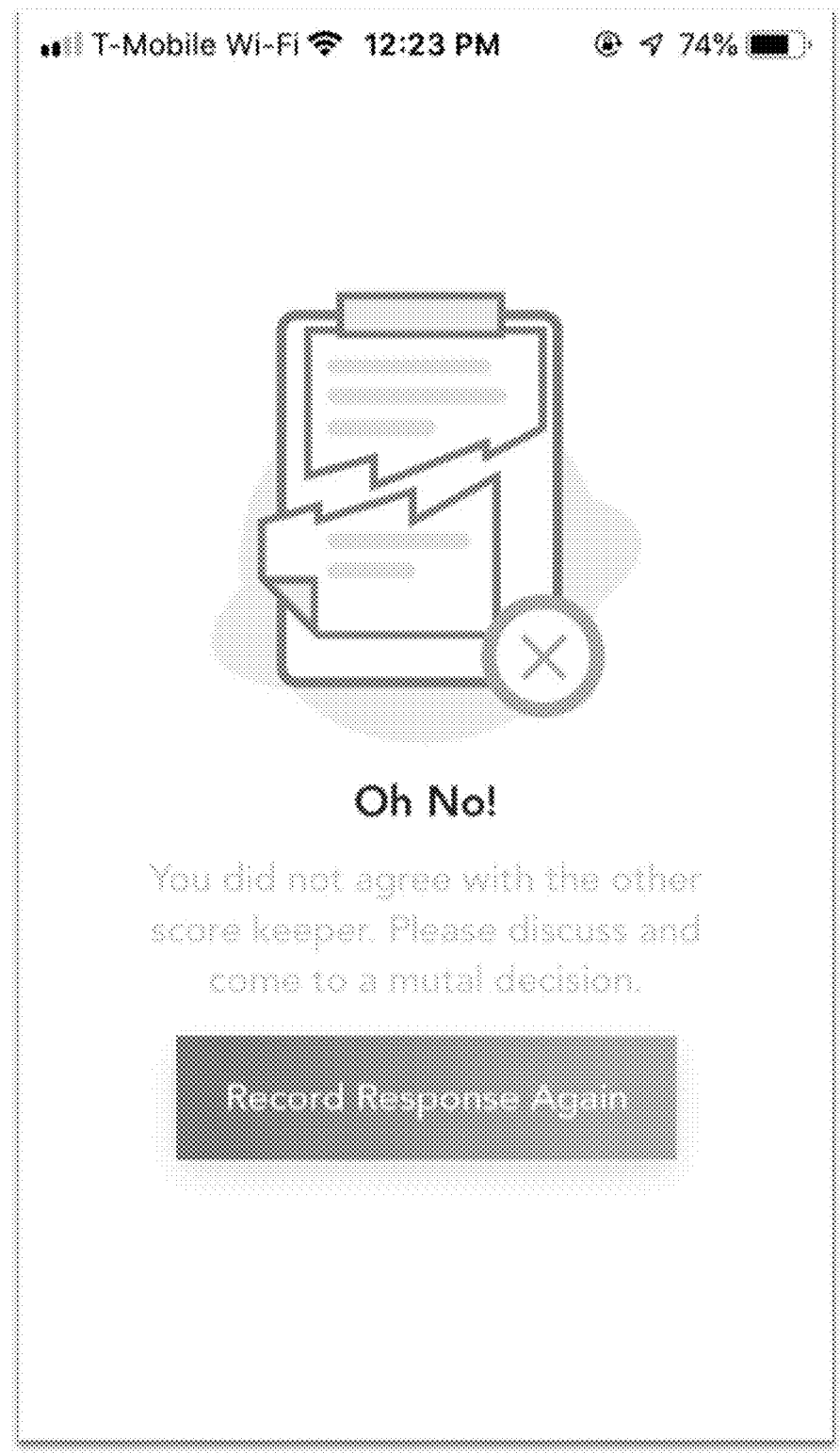
FIG. 2.22

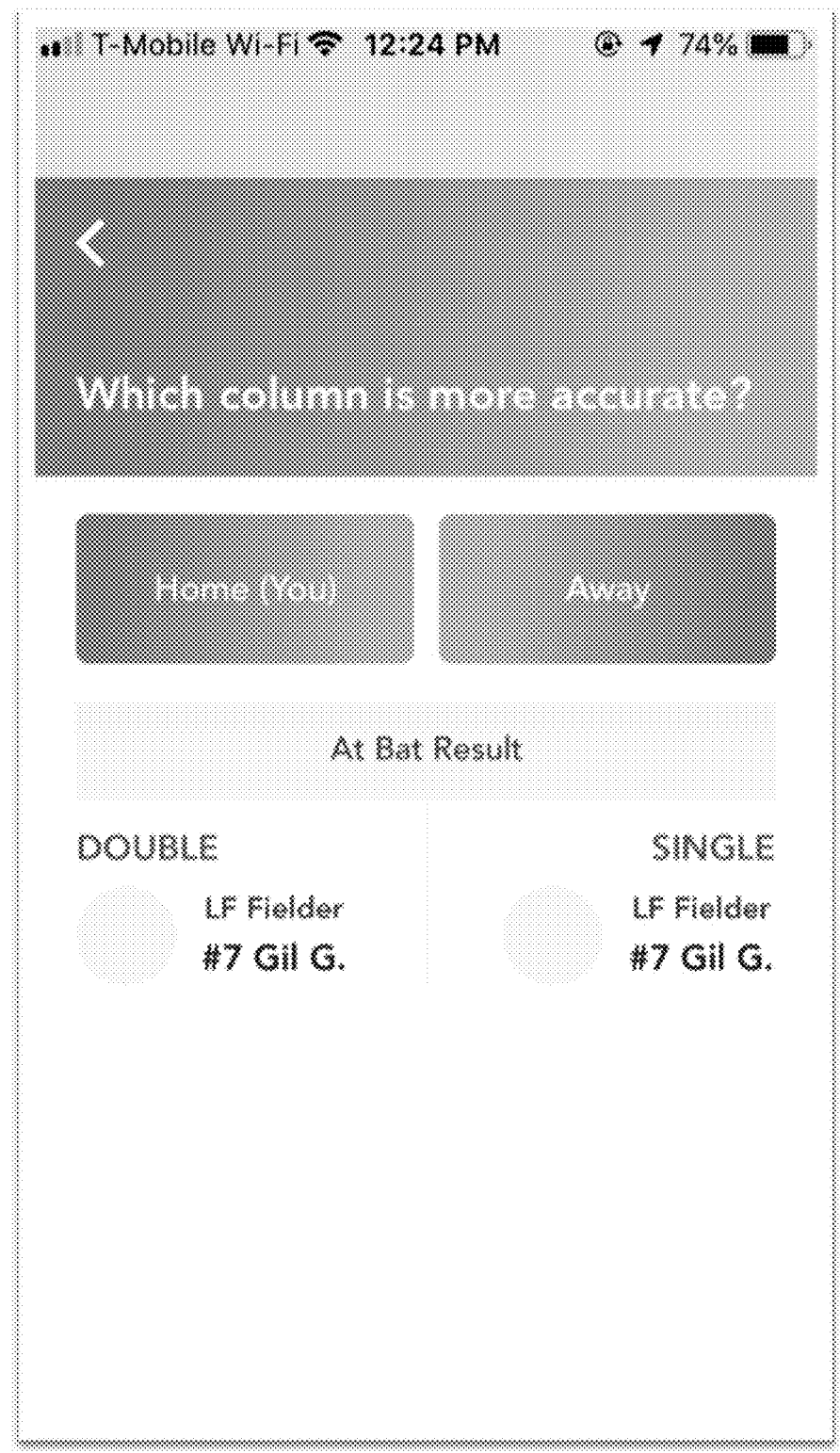
FIG. 2.23

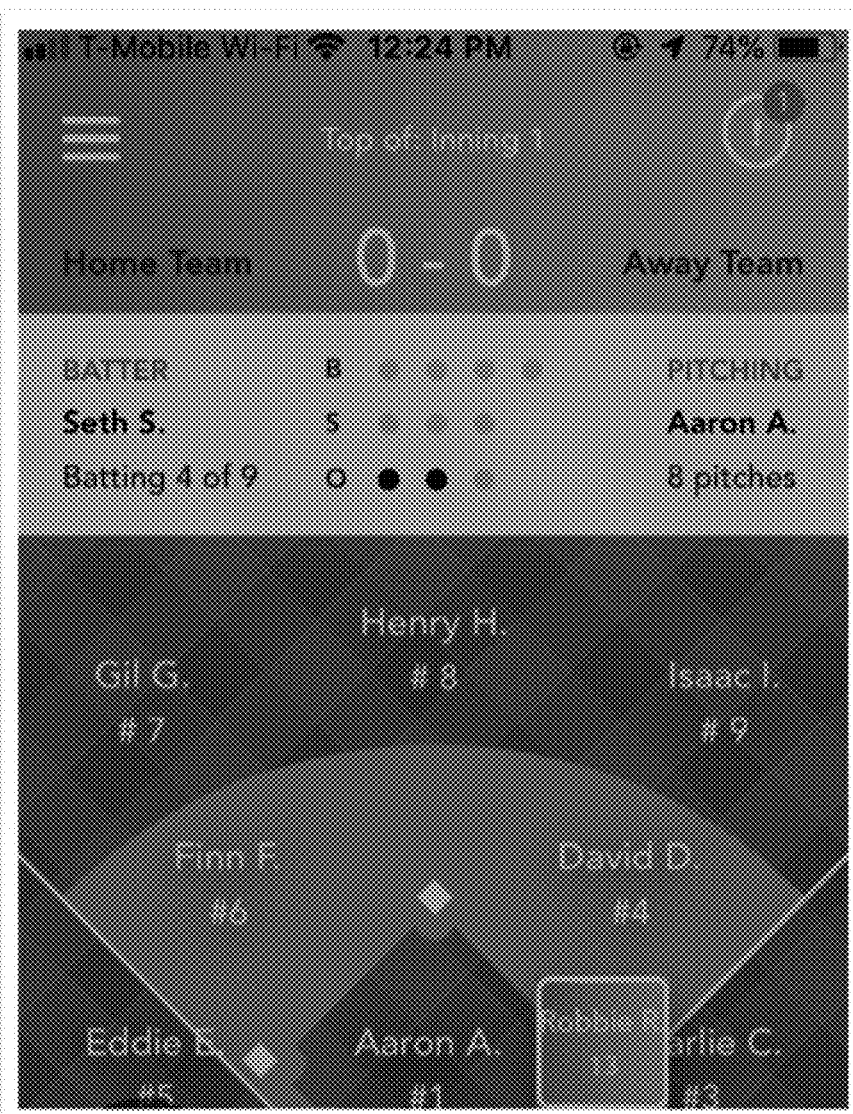
FIG. 2.24

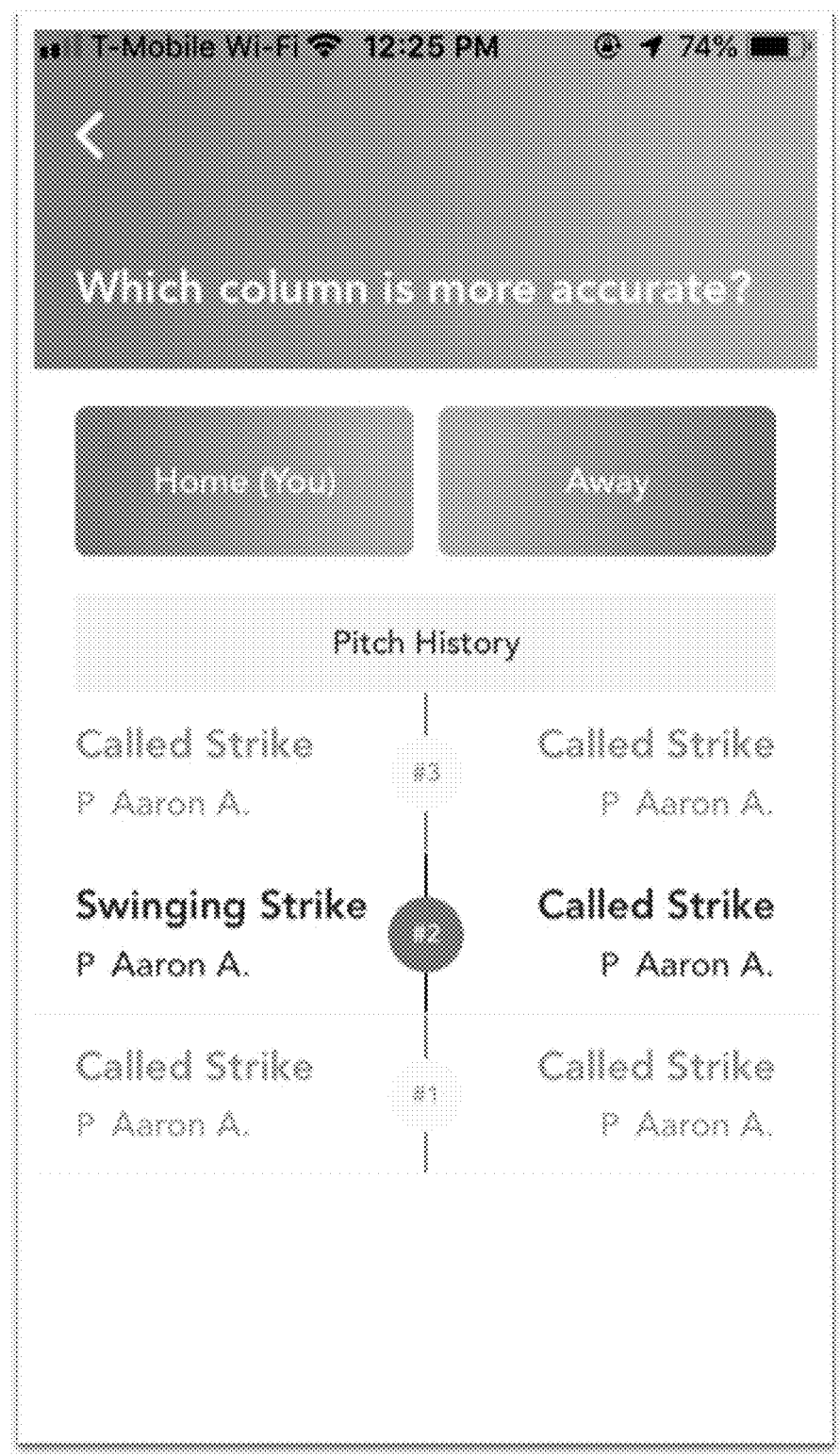
FIG. 2.25

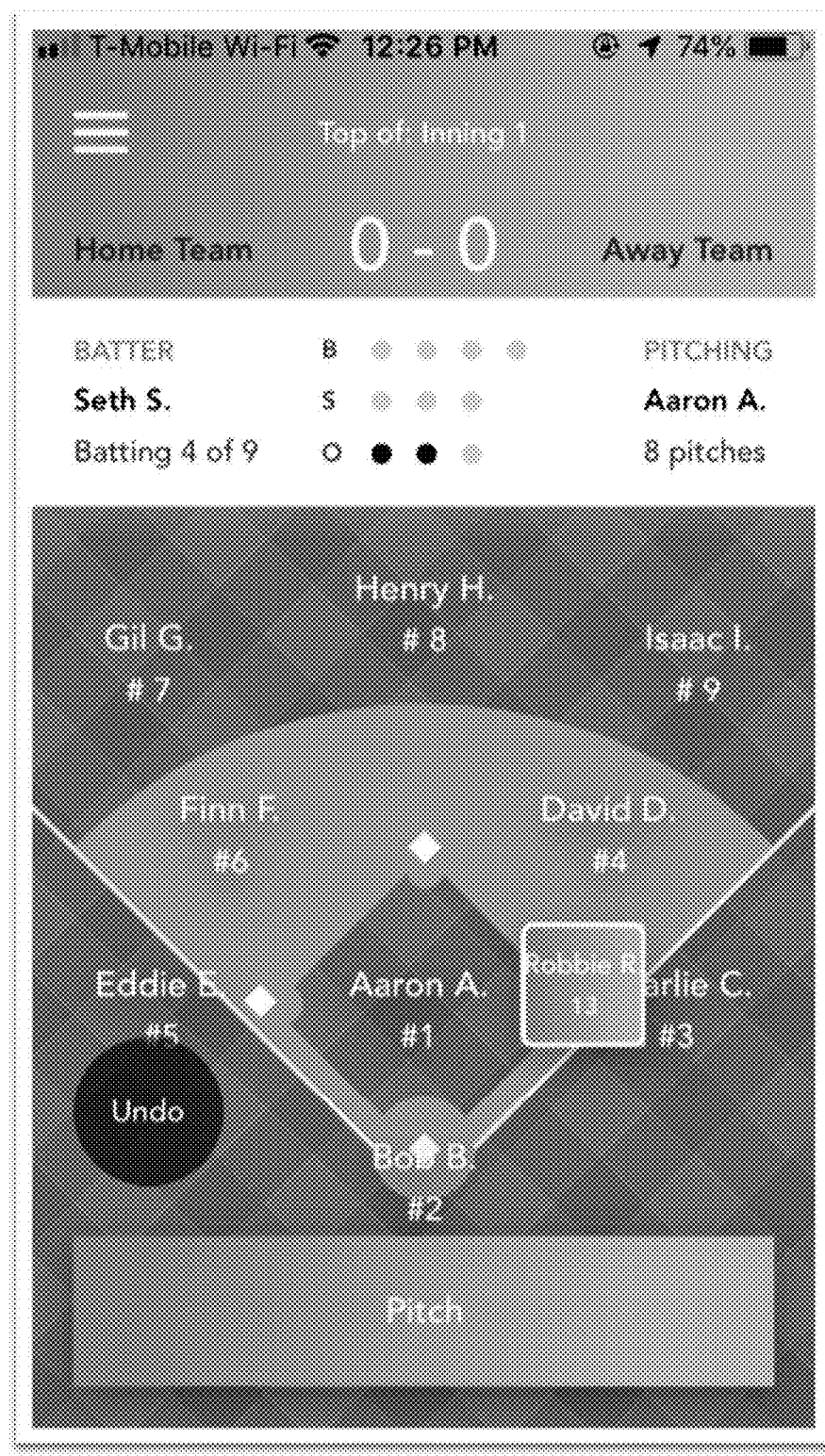
FIG. 2.26

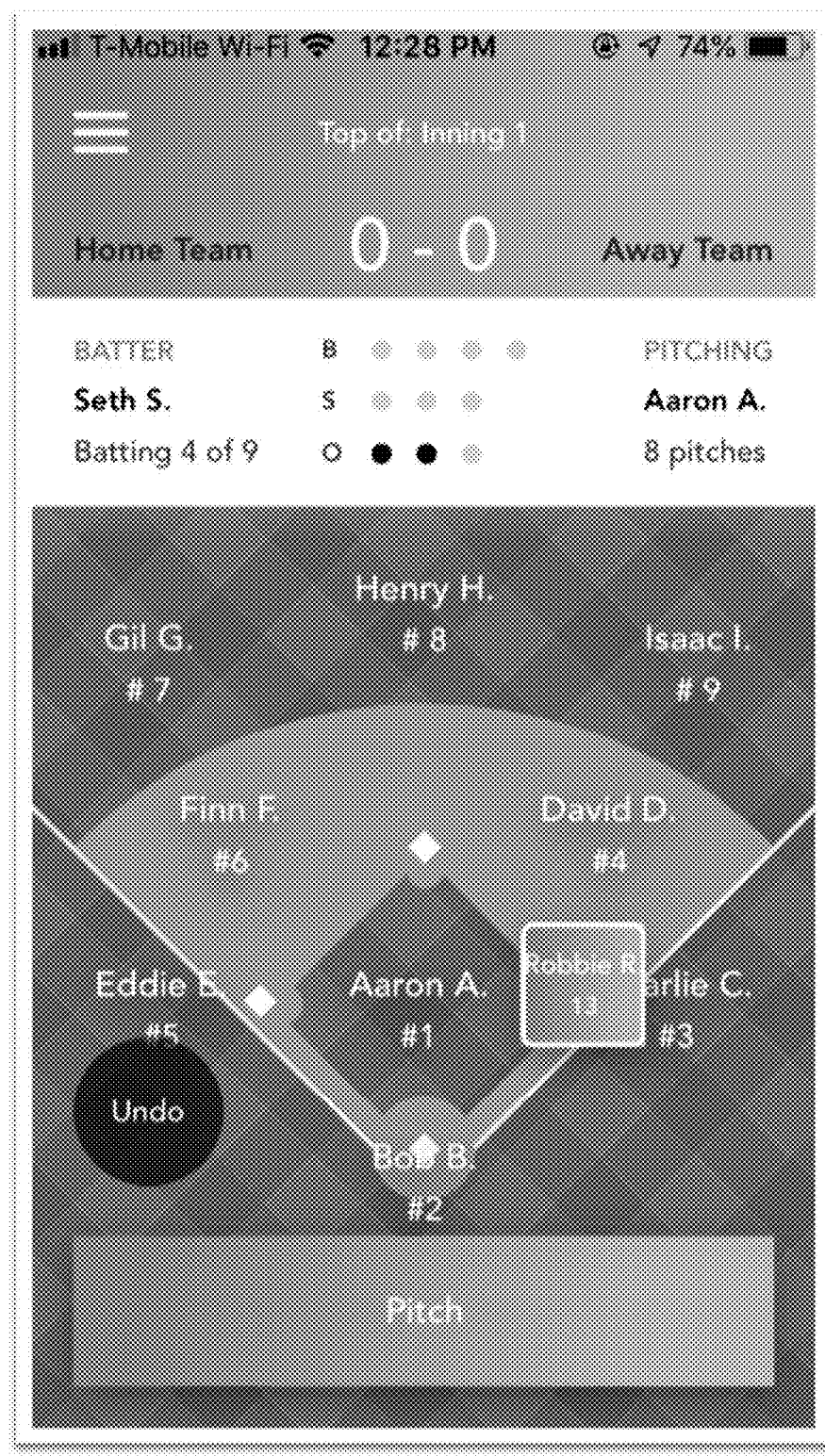
FIG. 2.27

SYSTEMS AND METHODS FOR RESOLVING DISCREPANCIES BETWEEN RECORDINGS OF GAME EVENTS

CROSS-REFERENCE TO RELATED APPLICATION

This application is a continuation of U.S. nonprovisional patent application Ser. No. 16/697,106, filed Nov. 26, 2019, which claims the benefit of U.S. provisional application No. 62/771,584, filed Nov. 27, 2018, the disclosure of each which is incorporated herein by reference in its entirety.

TECHNICAL FIELD

The present disclosure relates to systems and methods for resolving discrepancies between recordings of game events asentered by multiple score keepers. More particularly, the present disclosure relates to systems, software applications, tangible storage media, and methods that allow two or more score keepers to coordinate their scorekeeping of game events for the purpose of obtaining multiple scorekeepers a single, more accurate and/or complete record of the game, such as a baseball game.

BACKGROUND

Scorekeeping is an essential part of most sport games. While many games have technical rules that make scoring quite straightforward and mostly objective, there are often game events that may require somewhat subjective judgment, not to mention those games whose scoring is not purely technical but rather is in a large part intrinsically based on the judge's subjective judgment (e.g., gymnastics, figure skating, etc.). Even for those games for which scoring is mostly "objective", scorekeepers may not always be able to accurately record all game events faithfully due to the scorekeepers' lapse of attention, mis-entered information electronically, limitation in vision, or simply their particular viewing angle for the game events. In limited circumstances, these failures may be noted and raised by a player, coach, or other scorekeeper and corrected by using playback of recordings by video camera, but such correction will disrupt the ongoing game and often comes with a high price tag. In many instances even video playback could not solve many types of errors.

In professional sports or games, there are one or more designated referees or umpires who make(s) official rulings, and a paid professional who is the official scorekeeper. However, in amateur games such as high school or youth sports, there are typically amateur scorekeepers, one for each team, and many of these scorekeepers are not experts in the sport for which they are keeping score. Take baseball, as an example, for amateur high school and youth sports games. Though the score of the game is typically verified after the game and after any inning with complexity, the much more detailed record of every event in the game is not verified. Each team is responsible for their own players' statistics. This allows a player to have different statistics, depending on how each scorekeeper sees the play.

In almost all cases, scorekeeping is done on "paper", which doesn't directly allow for accurate coaching assessment, youth league regulation enforcement (e.g. pitch count, and ensuring player rotation), accurate historical account of play, accurate all-star, select, or "next level" assessment of player, a player's own personal enjoyment, a family member's enjoyment, etc. Considerable manual labor is required to summarize the detailed paper scorekeeping record into a more usable form. In the instance where a team does keep score digitally, the statistics collected are unlikely to be accurate because there is no verification. Collecting statistics in amateur baseball are notoriously inaccurate for two main reasons. Firstly, team scorekeepers are volunteers who have varying levels of understanding of scorekeeping and it is ultimately up to the team manager to determine what is acceptable. If they miss a play, it's often overlooked, and lost forever. And secondly, there is statistical bias. Scorekeepers tend to record their own players more favorably, especially when pressured by coaches to do so. In baseball, that typically means fewer errors and more hits for the scorekeeper's own team.

Methods and systems that ensure agreement between opposing scorekeepers are desirable for games to be recorded more accurately.

SUMMARY

In one aspect, the present disclosure provides a system for resolving discrepancies between recordings made by multiple scorekeepers for a game comprising discrete events. The system comprises a first personal computing device capable of communication with a remote server via a data network, where the first personal computing device has a first software application installed thereon, which when running, enables the first personal computing device to: receive a first recording of a game event from a predefined list of possible game events from a first scorekeeper from a UI on the first personal computing device; send the first recording to the remote server via the data network; receive, from the remote server, a report regarding a discrepancy between the first recording and a second recording of the same game event, the second recording being in disagreement with the first recording; present the discrepancy report on the UI of the first personal computing device; receive from the first scorekeeper a first response which comprises a selection from one of the first recording and the second recording, and send the first response to the remote server; and receive from the remote server a feedback message as to whether the selection by the first scorekeeper resolves the discrepancy.

In some embodiments of the system, the second recording is received by the remote server from a second personal computing device, the second recording is entered by a second scorekeeper. In some embodiments, the first recording comprises a description or characterization of the game event.

In some embodiments, the first software application enables the first personal computing device to: present the discrepancy report only after sending a plurality of first recordings to the server, the plurality of first recordings each for one of a predefined set of game events that have taken place (and as observed by the first scorekeeper). For example, for a baseball game, the predefined set of game events can comprise game events occurring in a single plate appearance, a half inning, or other game units or segments.

In some embodiments, the discrepancy report can include one or more recordings of previous game events. In other words, the discrepancy report can include entries that are not in disagreement, or can include more than one discrepancy.

In some embodiments, the system further comprises a second personal computing device capable of communication with the remote server via the data network, the second personal computing device having a second software application installed thereon, which when running, enables the second personal computing device to: receive the second recording on the game event from a second scorekeeper from a UI on the second personal computing device; send the second recording to the remote server via the data network; receive, from the remote server, the discrepancy report; present the discrepancy report on the UI of the second personal computing device; receive from the second scorekeeper a second response which comprises a selection from one of the first recording and the second recording, and sending the second response to the remove server; and receive from the remote server a feedback message as to whether the selection by the first scorekeeper and the selection by the second core keeper is in agreement.

In another aspect, the present disclosure provides a system for resolving discrepancies between score records made by multiple scorekeepers for a game. The system comprises a remote server operably connected to a first personal computing device and a second personal computing device via a data network, the remote server having a server software application installed thereon, which when running, enable the remote server to perform the following:

receiving a first recording regarding a game event from a predefined list of possible game events from the first personal computing device;
receiving a second recording regarding the game event from the second electronic device; determining if there is a discrepancy between the received first recording and the second recording, and if there is a discrepancy:
sending a report about the discrepancy to the first personal computing device; sending the report to the second personal computing device;
receive a first response from the first personal computing device regarding a selection between the first recording and the second recording;
receive a second response from the second personal computing device regarding a selection between the first recording and the second recording; and
based on a comparison of the first response and the second response, determine whether the discrepancy has been resolved.

In some embodiments, the server software application enables the remote server to send the report about the discrepancy only after a plate appearance is completed. In some embodiments, the server software application enables the remote server to send the report about the discrepancy immediately upon a positive determination or detection of the discrepancy.

In yet a further aspect, the present disclosure provides a computer-implemented method for resolving discrepancies between game records made by multiple scorekeepers for a game, the method being operable on a first personal computing device capable of communication with a remote server via a data network. In the method, the first personal computing device receives a first recording of a game event from a predefined list of possible game events from a first scorekeeper from a UI on the first personal computing device; the first personal computing device sends the first recording to the remote server via the data network; the first personal computing device receives, from the remote server, a discrepancy report regarding a discrepancy between the first recording and a second recording of the same game event, the second recording being in disagreement with the first recording; the first personal computing device displays the discrepancy report on the UI of the first personal computing device; the first personal computing device receives from the first scorekeeper a first response which comprises a selection from one of the first recording and the second recording, and sends the first response to the remote server; and the first personal computing device receives from the remote server a feedback message as to whether the selection by the first scorekeeper resolves the discrepancy.

In yet a further aspect, the present disclosure provides a computer-implemented method of resolving discrepancies between game records made by multiple scorekeepers for a game, the method being operable on a system comprising a first personal computing device, a second personal computing device, and a remote server operably connected to a first personal computing device and a second personal computing device. In the method, the first personal computing device receives a first recording on a game event from a predefined list of possible game events from a first scorekeeper; the first personal computing device sends the first recording to the remote server via the data network; the second personal computing device receives a second recording on the game event from a second scorekeeper; the second personal computing device sends the second recording to the remote server via the data network; the remote server determines whether there is any discrepancy from the first recording and the second recording, and if it is determined there is a discrepancy: the remote server sends a message regarding the discrepancy to each of the first personal computing device and the second personal computing device; the first personal device receives a first response from the first scorekeeper regarding a selection between the first recording and the second recording, and sends the first response to the remote server; the second personal device receives a second response from the second scorekeeper regarding a selection between the first recording and the second recording, and sends the second response to the remote server; the remote server based on the received first response and second response determines if there is an agreement between the first response and the second response. In some embodiments of the method, the remote server sends the discrepancy report only after receiving a plurality of recordings from each of the first and second personal computing devices, the plurality of recordings each being one of a predefined set of game events that have taken place. The predefined set of game events can comprise game events occurring in a single plate appearance in a baseball game. In alternative embodiments, the remote server can send the report about the discrepancy immediately upon a positive determination of the discrepancy.

In above systems and methods, the game event can be an event that has occurred, or has not occurred (in the latter case the recording of which would be a proposed recording).

In yet a further aspect, the present disclosure provides a computer-implemented method of resolving discrepancies between game records made by multiple scorekeepers for a game, the method being operable on a system comprising a first personal computing device, a second personal computing device, and a remote server operably connected to a first personal computing device and a second personal computing device. The method includes: the first personal computing device receiving a first recording on a game event (either an event that has taken place or one that has not but may happen later) from a predefined list of possible game events from a first scorekeeper, the first recording being tagged as requiring immediate resolution; the first personal computing device sending the first recording to the remote server via the data network; the remote server detecting the status of the first recording as requiring immediate resolution; the remote server sending an alert message to a second personal computing device, the message comprising a request for an acceptance of the first recording; the second personal computing device presenting the alert message to a UI of the second personal computing device; the second personal computing device receiving a response from a second scorekeeper regarding whether the second scorekeeper accepts the first recording; the second personal computing device sending the response to the remote server; and the remote server determines, based on the received response, whether the first recording is to be accepted as an official recording of the game event. In some embodiments of the method, if the remote server determines the first recording is to be accepted as the official recording of the game event, the method further comprising the remote server sending a message to each of the first and second personal computing device, wherein the message includes instructions to store the first recording as an official recording of the game event.

In a further aspect, the present disclosure also provides non-volatile and/or non-transient media storing the software applications described herein.

BRIEF DESCRIPTION OF THE DRAWINGS

FIGS. 2.1-2.27 are a series of screenshots of a GUI of a personal computing device implementing some embodiments of the disclosed subject matter in the context of a baseball game.

DETAILED DESCRIPTION

Figure 1A:
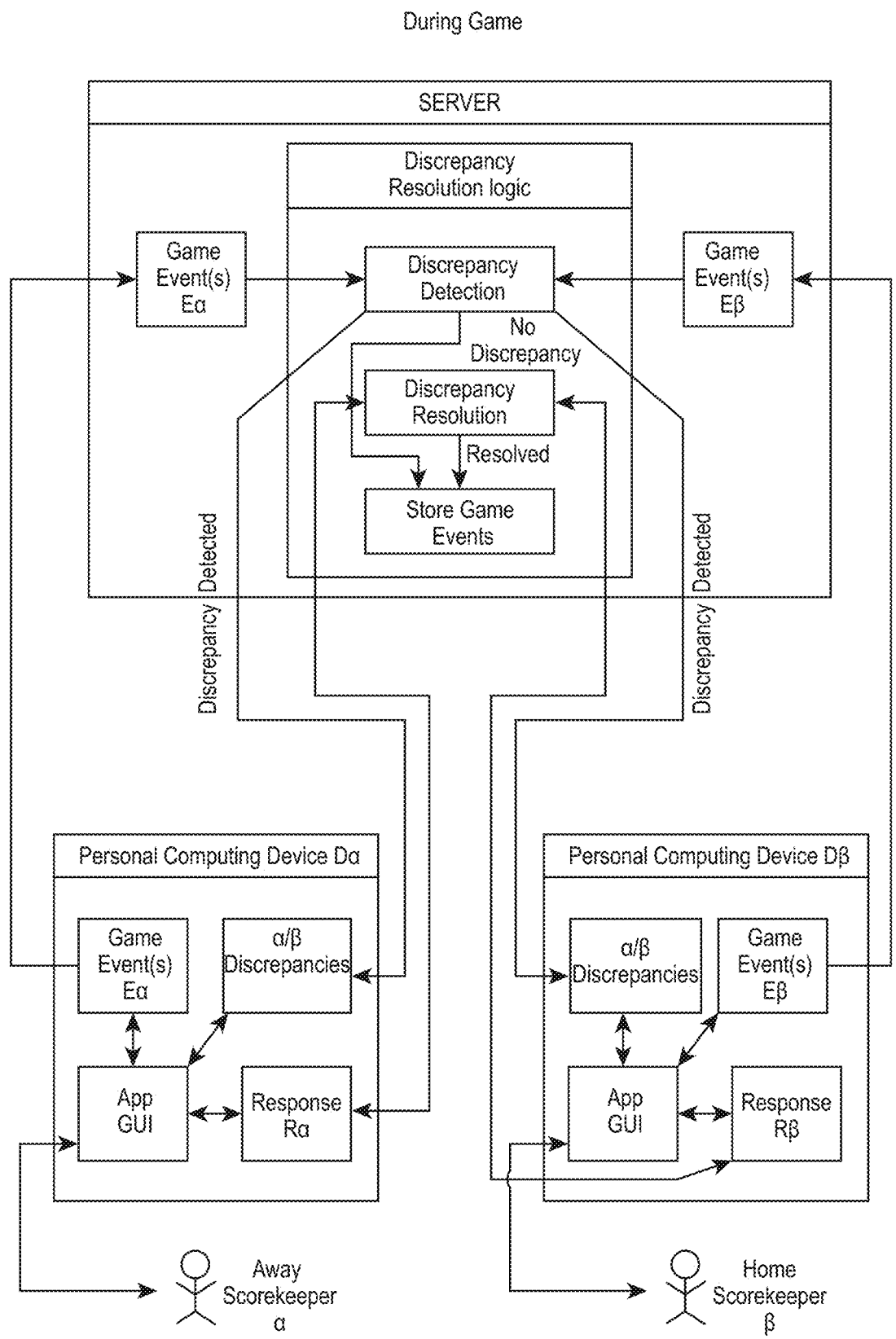
FIG. 1A is a diagram showing an example system and associated operations performed by and among the system components during a game according to certain embodiments of the disclosed subject matter.

In general, the present invention provides a method and system for resolving a discrepancy between two electronic scorekeeping systems that are being used to record events of same game on two client systems, e.g., personal computing devices (or a terminal, e.g., laptop computers, tablet computers, smart mobile phones, etc.). Two versions of the recordings of game events are stored electronically, one by and for each scorekeeper in their respective personal computing devices, and are compared with each other according to certain preset schedules or criteria. Each time when there is a discrepancy detected between the two versions of a game event entered by different scorekeepers, a method for resolving the discrepancy will be made available to one or both scorekeepers, in some cases demanding an immediate resolution of the discrepancy, and in other cases noting the discrepancy and allowing resolution at some time after zero or more game events are recorded. There may be any number of unresolved discrepancies while the game is incomplete and still being scored.

In some embodiments, to complete scorekeeping for a given game, all discrepancies for objective game events must be resolved, resulting in two identical versions of the game. When the number of remaining discrepancies is zero, and both scorekeepers agree that the game is over and all events in the game have been recorded, the scorekeeping for the game may be completed, with one and only one version of game events resulting from the two scorekeepers' separate collection of game events.

In some embodiments, discrepancy for subjective game events such as an error in baseball can be noted as a discrepancy but can have scorekeepers "agree to disagree" and therefore have two versions at game end. The official version of the game would be according to the rules of that sport (i.e. the home team is the official book in baseball), but there could be a notation by each subjective play disagreement.

The discrepancy resolution systems, software and methods described herein can result in a single, more accurate game record, which can serve as an essential building block in an automated administration system. For example, league scores, standings, statistics, pitcher eligibility based on pitch count and rest, etc. can all be immediately updated at the conclusion of each game, so long as the recorded game events are identical for both the home and away scorekeeper. There is no chance for ambiguity or appeal when the records between the two teams always match.

As used herein, a personal computing device and a server can be considered to have components and architecture of a general purpose computer, including a processor (CPU), a memory associated with the CPU, I/O interface, communication component, data (wired/wireless) connection interface, etc., which can communicate through a system bus. The memory includes a nonvolatile memory in which computer program product(s) (or software) can be stored, which when activated or running (e.g., executed by the CPU), enables the computing device or the server to perform certain functions according to the instructions of the computer program product. When the client software is activated (the details of which will be further described below), a user interface (UI), or graphical UI, may be loaded on the display area of the personal computing device so as to display information to a user and allow a user to interact with the software, e.g., through areas of a touchscreen designated in the computer software.

FIG. 1A is diagram showing an example system and associated operations performed by and among the system components during a game according to certain embodiments of the disclosed subject matter. As used herein, a game can be a sport game or non-sport game which essentially is a structured form of play that includes a collection of game events, each of the game events may be evaluated and recorded to form a sequence of recordings of what happened in the game. From such recordings one may determine, among other things, if any player (or team of players) has won the game, the score of the game, a player's performance or statistics in certain aspects of the game, etc. A sport game can include baseball, football, basketball, soccer, tennis, etc. A non-sport game includes chess, poker, a board game, a computer game, etc.

As shown in FIG. 1A, a first scorekeeper, away scorekeeper $\alpha$ (signifying a scorekeeper for a guest or away team), enters one or more recordings of game events $E_\alpha$ in a first personal computing device $D_\alpha$ through a UI of a first client software program (or App) installed on the first personal computing device $D_\alpha$. The recordings of game events $E_\alpha$ (e.g., $E1_\alpha$, $E2_\alpha$, $E3_\alpha$ ... ) are sent from the first personal computing device $D_\alpha$ to the remote server (or server) via a data network or combination of data networks (such as for example the Internet, a corporate intranet, a virtual private network (VPN), a local-area network (LAN), a wireless local-area network (WLAN), a cellular network, a wide-area network (WAN), a metropolitan-area network (MAN), or a combination of two or more such networks). It is understood as described herein, when referring to sending or receiving any recordings, user input or responses, or other digital "object" representing a real-world counterpart, it is meant to refer to signals encoding the underneath data representing the object being transmitted between the server and the personal computing devices. The client App may be a web browser or a native application executed on processor of the personal computing device(s).

A second scorekeeper, home scorekeeper β (signifying a scorekeeper for a home or host team), enters one or more recordings of game events $E_\beta$ in a second personal computing device $D_\beta$ through a UI of a second client software program (or App) installed on the second personal computing device $D_\beta$. The second software program could be the same as the first software program or perform same or similar functionalities described herein as relating to displaying scorekeeper's recordings of game events, receiving scorekeeper's inputs, sending and receiving messages from and to the remote server. The recordings of game events $E_\beta$ (e.g., $E1_\beta$, $E2_\beta$, $E3_\beta$ ... ) are also sent from the second personal computing device $D_\beta$ to the server via a data network.

The server includes a software application installed thereon which has a discrepancy resolution logic which compares the recordings of the game events $E_\alpha$ and $E_\beta$ sent by the two scorekeepers. The logic can include two basic modules: (1) discrepancy detection/generation module; and (2) discrepancy resolution module. The logic can be configured to run whenever two recordings of a same game event have been received from $D_\alpha$ and $D_\beta$, or the logic can run when the recordings received from α and β cover a predefined set of possible game events that have taken place or are taking place when the recording is being performed, e.g., for a baseball, a plate appearance, or half an inning. As used herein, a plate appearance is a collection of one or more pitches and possibly other events experienced by a batter that end when this batter is put out or becomes a runner. The events in a single plate appearance include but are not limited to: Ball, Called Strike, Swinging Strike, Foul Ball, Ball in Play, Hit by Pitch, Attempted Pickoff, Pinch Runner Substitution, Picked Off, Stolen Base, Caught Stealing, etc.

Any recordings by α and β of any game event are first run through the discrepancy detection module. If the discrepancy detection module determines that any pairs of recordings about a same event entered by different scorekeepers α and β, e.g., $E1_\alpha$ and $R1_\beta$, $E2_\alpha$, and $E2_\beta$, do not agree with each other, it can generate a discrepancy report and send it out to each of $D_\alpha$ and $D_\beta$. Such a report can include just one discrepancy for a single game event (i.e. a single pitch in baseball), or a grouping of game events into a logical game unit, with each discrepancy within the group highlighted (i.e. a plate appearance in baseball listing all the events within the plate appearance, with any and all discrepancies identified). The discrepancy report can be presented to a UI of each of the $D_\alpha$ and $D_\beta$, either directly without scorekeeper's prompt, or remain hidden until the scorekeeper activates it to make it visible. The discrepancy report can be formatted to include a comparison of the recording(s) entered by a and the recording(s) entered by β, and the UI of each of $D_\alpha$ and $D_\beta$ can be configured to accept input or response of scorekeeper α and β respectively to select the recording(s) that he believes is correct or should be taken as the official record of the game. This might include creating a new version of the game events that has not been recorded by either α or β. The responses from each of scorekeepers α and β, $R_\alpha$ and $R_\beta$ are then sent back to the discrepancy resolution module of the discrepancy resolution logic of the remote server. If $R_\alpha$ and $R_\beta$ agrees with each other (e.g., if each of scorekeeper α and β selects Eα as the more "correct" version of the game event), the discrepancy resolution module can determine that the discrepancy has been resolved, in which case it will store the agreed-upon recording of the events to be included as the official record of the game. If $R_\alpha$ and $R_\beta$ do not agree with each other, the discrepancy resolution module can resend the discrepancy report to either or both of $D_\alpha$ and $D_\beta$ with an alert message to be presented on the UI of $D_\alpha$ and $D_\beta$ urging α or/and β to resolve the discrepancy. This process can repeat until α and β both agree on a particular version/recording of the game event, or when α and β agree to disagree in particular cases (they agree on how to resolve the discrepancy but maintain their different opinions on the recording of a game event, e.g., in cases where subjective judgment can play a significant role), and in any event both agree to adopt a same recording (e.g., a single description or version) of the game event from which the discrepancy arises. In the "agree to disagree" scenario, the eventual "official" game records may be stored in a way with these "quietly disputed" entries annotated, e.g., as a reminder for later analysis.

If the discrepancy detection module determines a pair of recordings about a same event entered by different scorekeepers α and β agree with each other, it can simply store either recording as an official record of the game. (Alternatively, the server does not need to store these recordings if they have been stored in $D_\alpha$ and $D_\beta$, but in this instance the server can send a message to both $D_\alpha$ and $D_\beta$ that there is no discrepancy.) Those recordings of game events from α and β that agree with each other without having to go through the discrepancy resolution mechanism as described herein can also be saved/stored together with the "true" or "correct" recordings as a result of the resolution discrepancy mechanism to form a complete official record of the game, Eγ.

Figure 1B:
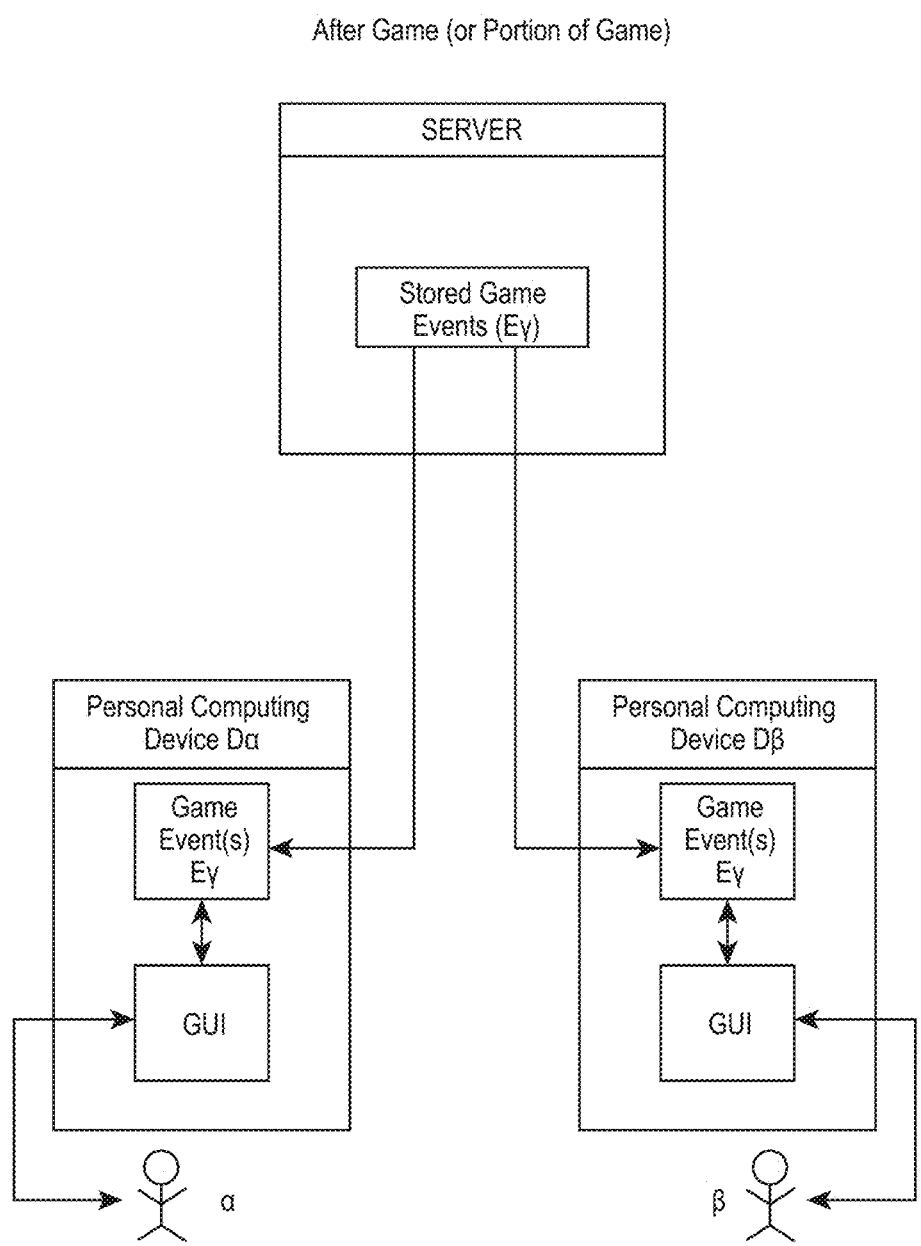
FIG. 1B is a diagram showing certain operations of the system depicted in FIG. 1A after a game is completed (or a portion of a game is completed) according to some embodiments of the present disclosure.

To enable both devices $D_\alpha$ and $D_\beta$ to start to record the same game and the server to recognize such, either scorekeeper α or β can initiate a request for a recording session for a game and notify the server. The server can create a unique identifier for the game and send authentication and other necessary information to both scorekeepers for their confirmation. Once the recording session is established (much like a multiparty conference call line is established), the two scorekeepers, their personal computing devices and the server may perform the process as illustrated in FIG. 1A and FIG. 1B below. Other ways of initiating the recording session are also available, for example, by a manager of the server software sending out notices from the server to all participating scorekeepers' (and their devices) at the start of a game. Any other suitable ways of initiating the recording session are also contemplated.

FIG. 1B is a diagram showing certain operations of the system depicted in FIG. 1A after a game is completed (or a portion of a game is completed, e.g., a plate appearance is completed) according to certain embodiments of the present disclosure. At that point, as described earlier, the server has stored a collection of recordings that are considered to be official or "correct" recordings of the past game events for the entire game (or for the portion of the game before the sync process is performed). Such data of the collection of recordings can be saved in a database residing on the server (or a database accessible by the server) or in other places and in other manners. These recordings of game events are transmitted or otherwise synced to both personal computing devices $D_\alpha$ and $D_\beta$. At the completion of this sync process, each of $D_\alpha$ and $D_\beta$ will now have the same complete unified/reconciled recordings about the entire game $E\gamma$ (or about the portion of game that has just been completed).

It is understood as used herein, a recording of a game event can be a recording of a game event that has occurred, or it can also be a proposed recording of an event that have not taken place yet.

Figure 3:
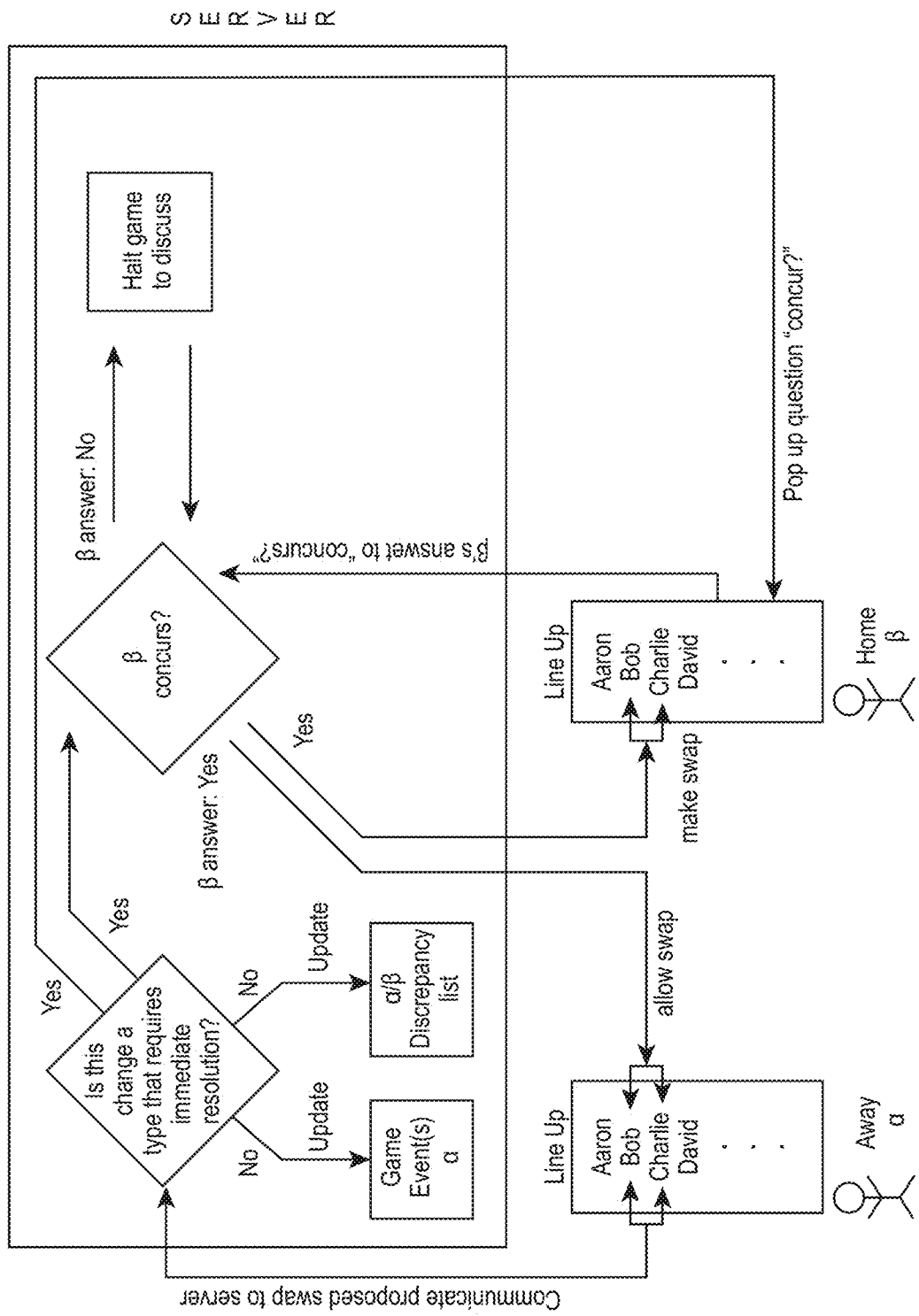
FIG. 3 is a diagram showing a process of resolving a discrepancy between two scorekeepers, the discrepancy requiring to be resolved immediately.

FIGS. 1A and 1B illustrate how certain discrepancies may be resolved before the game is over, but there is no need to resolve them immediately after the discrepancy is detected. These discrepancies can be termed "asynchronous discrepancies". There are also types of discrepancies that need to be resolved immediately before the game can proceed (otherwise the subsequent discrepancies between the scorekeepers can become unmanageable). For example, as illustrated in FIG. 3, in a baseball game, when scorekeeper α changes the batting order, β is immediately notified and must confirm or deny the change immediately. If the proposed batting order change is denied, the game must be stopped until the scorekeepers, umpires, and managers are able to sort out the correct batting order. In such a case, the event recording by α can be tagged as requiring immediate resolution, and as soon as the server receives the recording from $D_\alpha$, it detects such a status, and sends an alert message to $D_\beta$ (the message including a request for an acceptance of the first recording) to be presented to a UI of $D_\beta$. Scorekeeper β enters a response regarding whether he accepts the event recording proposed by α, and sends the response to the server. The server then determines, based on the received response from $D_\beta$ whether the recording by α is to be accepted as the official recording of the game event. If β does agree with α on α's proposed event recording, the recording is allowed and the state of the software program on both $D_\alpha$ and $D_\beta$ may be altered to reflect the change. If β does not agree with α, they may need to communicate in other means, e.g., by directly talking to each other, to resolve their disagreement.

The actions/operations performed by the server shown in FIGS. 1A and 1B are generally referred to as the server functions, which can be implemented on a server computer using software application and/or hardware or any combinations thereof. The actions/operations performed by the personal computing devices $D_\alpha$ or $D_\beta$ shown in FIGS. 1A and 1B are generally referred to as the client functions, which can be implemented on the personal computing devices using software application (e.g., client mobile App) and/or hardware or any combinations thereof.

The system and process shown in FIGS. 1A and 1B are further illustrated in FIGS. 2.1-2.27, which are a series of 27 screenshots of a GUI on two mobile personal computing devices implementing some embodiments of the disclosed subject matter in the context of a baseball game. Below is a description of these screenshots and respective scorekeepers' actions and associated methods implemented in the computing device to effectuate those actions.

FIGS. 2.1-2.6 are screenshots of a home scorekeeper Bob (β), arranged in a chronological order as Bob records what happens in a baseball game.

FIG. 2.1 is a GUI of a software program on the touchscreen of a home scorekeeper Bob's mobile personal computing device (e.g., a smart mobile phone) $D_\beta$, indicating two unresolved discrepancies (the number 2 on the circumference of a circle enclosing an exclamation mark near the upper right corner of the screen, which on this interface can be used as a trigger to bring up a current list of discrepancies) that can be resolved at any time before the game is over. This illustrates asynchronous discrepancy resolution. The GUI provides a representation of a baseball field and player's positions as well as current game state, after the first two plate appearances of the game have occurred, and whose events have been fully recorded by both scorekeepers. It is noted that the GUI may be updated to reflect changes in the game and play-by-play game action as the game progresses. Certain screen areas of the GUI, such as the areas representing different players' positions, have been programmed to respond to a user's touch (simple contact by fingers or other more complicated gestures) to change the display, to show separate menus, etc. Alternatives to the GUI can be implemented, for example, without showing the graphical representation of the baseball field.

Behind the scene, Bob was distracted at game start by his youngest daughter asking for a snack, causing him to miss the first pitch, which caused the first discrepancy. A couple of minutes earlier, he had already indicated that he agreed with the other scorekeeper's (Alice's) version, but Alice has not yet chosen a version for that first plate appearance. (Notice the number of pitches displayed is 6, which is different than the number of pitches seen by the other scorekeeper in FIG. 2.7, which will be described hereinafter). Bob does not have time to examine and resolve the other discrepancy yet because a ball is immediately hit into play. Bob clicks on the "Pitch" button on the GUI to bring up the pitch menu (shown in FIG. 2.2).

FIG. 2.2: The "Pitch" menu (or pop-up window) activated by Bob clicking the "Pitch" button (shown in FIG. 2.1) includes a few different predefined options. Bob selects the game pitch event, "Ball in play."

FIG. 2.3: With "Ball in Play" menu up, Bob selects the type of ball in play, "double."

FIG. 2.4: With "Who Fielded the ball" screen, Bob selects left fielder "Gil G #7."

FIG. 2.5: With selections complete, Bob is returned to the main field view. With discrepancies not yet resolved, the number of pitches is 7, the runner is on $2^{nd}$ base, and 2 discrepancies are shown. The other scorekeeper, Alice, has not yet finished recording the $3^{rd}$ plate appearance when the ball was hit into play. Bob has time to peek at the list of discrepancies, so he clicks on the red "2" to bring up the discrepancy list.

FIG. 2.6: Bob examines the two discrepancies labeled with identifying information. Note that the granularity of a comparison is a specific plate appearance that each scorekeeper has finished scoring. Even if there is a difference between one specific pitch of the plate appearance, in this embodiment of the invention, the difference detected by the remote server by comparing the received recordings from both scorekeepers is not reported back to either scorekeeper until the entire plate appearance is complete. Bob notes that the list of discrepancies currently lists the two batters who were from the first 2 plate appearances. It turns out there will be a $3^{rd}$ discrepancy for the $3^{rd}$ batter as well, but Bob doesn't know this yet because Alice has not yet completed her recording of the "Ball in Play" for the $3^{rd}$ plate appearance. Bob notes the status of the two discrepancies—the first he has responded to, but Alice has not. For the second plate appearance, Alice has responded, but Bob has not. Discrepancies are not resolved until both scorekeepers respond and choose the same version.

FIGS. 2.7-2.18 are screenshots of GUI on a touchscreen display of a personal computing device (like that of Bob's) of the away scorekeeper Alice (α). Again the sequence of the screenshots is according to time lapse.

FIG. 2.7 is a snapshot of what is shown on the display of Alice's mobile phone $D_\alpha$ which includes a representation of a baseball field and player's positions as well as current game state, before she starts recording the $3^{rd}$ plate appearance. She also had 2 discrepancies. Notices how the number of pitches shows 7, which is different from the 6 pitches shown on Bob's phone device in FIG. 2.1. This is because they recorded the first plate appearance differently. Alice has no time to examine the list of discrepancies because a ball is immediately hit into play. Alice clicks on the "Pitch" button on the screen to bring up the pitch menu (shown in FIG. 2.8).

FIG. 2.8: The "Pitch" menu is shown, and Alice selects "Ball in play."

FIG. 2.9: With "Ball in Play" menu up, Alice selects the type of ball in play, "single."

FIG. 2.10: With "Who Fielded the ball" screen, Alice selects left fielder "Gil G #7."

FIG. 2.11: With selections complete, Alice is returned to the main field view. A discrepancy was generated immediately after Alice completed her recording of the third plate appearance, which changes the number of discrepancies from 2 to 3 (see top right corner of the screenshot). With no discrepancies yet resolved, the runner is on first, and the number of pitches is 8, which differs from what Bob sees in FIG. 2.5.

At this time, the head coach visits the pitcher, giving Alice some time to resolve some discrepancies. She clicks on the red 3 to bring up the discrepancy list.

FIG. 2.12: Alice examines the 3 discrepancies labeled with identifying information. Note that the granularity of a comparison in this embodiment is a specific plate appearance that each scorekeeper has finished recording. Even if there is a difference between one specific pitch of the plate appearance, in this embodiment of the invention, the difference detected by the remote server by comparing the received recordings from both scorekeepers is not reported back to either scorekeeper until the entire plate appearance is complete.

Alice notes that the list of discrepancies currently lists the 3 batters who were from the first 3 plate appearances. Alice notes the status of the 3 discrepancies—the first she has not responded to, but the other scorekeeper Bob has. The second she has responded to, but Bob has not responded to. Neither scorekeeper has yet responded to the third discrepancy. Discrepancies are not resolved until both scorekeepers respond and choose the same version.

Alice decides to examine and resolve the $3^{rd}$ discrepancy for the ball that was just hit into play. So she selects the third discrepancy by touching that area of the screen.

FIG. 2.13: Alice views the detailed comparison of her selected version of the last play with Bob's version, as displayed in two columns. She is certain that the hit was a single, as indicated by her Away version. So she selects the Away version by touching the Away button.

FIG. 2.14: Alice views the message acknowledging her submission, and selects "resume game" to finish with this screen.

FIG. 2.15: Alice returns to the list of discrepancies. The only one she has not responded to is the first discrepancy, so she selects it while the head coach continues to talk with the pitcher.

FIG. 2.16: Alice views the details of the discrepancy. She is certain that the first pitch of the game thrown was a ball, and figures the other scorekeeper hadn't yet started paying attention to the game. So she selects her version, the Away version of the first plate appearance.

FIG. 2.17: Alice sees a message indicating a successful resolution as both scorekeepers agreed with this version of events. (The remote server has received a response from Bob, compared Bob's and Alice's response, and determined that they were in agreement, and sent this "Success" message to Alice's device). She clicks "resume game" to finish with this screen.

FIG. 2.18: Alice returns to the main field view. Note how the number of discrepancies has been reduced from 3 down to 2.

FIGS. 2.19-2.26 are again screenshots of the Home scorekeeper Bob (β).

FIG. 2.19: Switching to see what is happening with Bob (home scorekeeper beta) on his mobile personal computing device $D_\beta$, Bob notices nothing different about his main screen after taking a break to clean up a mess his young daughter made with her snack. However, he does notice that his screen shows the runner on $2^{nd}$ base, yet on the field, the runner is actually on $1^{st}$ base. This is different from what the other scorekeeper sees in FIG. 2.18, as the single vs. double discrepancy has not yet been fully resolved.

During that 60 second break he took, the head coach was talking to the pitcher, while the other scorekeeper Alice finished scoring the $3^{rd}$ plate appearance and resolved some discrepancies. Yet the number of discrepancies remains 2. Bob clicks on the discrepancy inspection area on the upper right corner to bring up the discrepancies list as he thinks he can quickly resolve them before the next batter gets started.

FIG. 2.20: The menu or list of two discrepancies are shown. They are different from what it was in FIG. 2.6. The discrepancy for the first batter in FIG. 2.6 is gone because it was resolved—the other scorekeeper Alice must have also selected her version (Bob had previously selected it because he knew that he had missed the first pitch of the game when he got a snack for his young daughter). But there is an additional discrepancy for the third batter. Glancing out to the field, Bob sees that in his rush to go help his daughter clean up, he inadvertently selected double instead of single when scoring the last play. So Bob selects the discrepancy related to the last play (third batter).

FIG. 2.21: The detail of the discrepancy (on the single vs. double) is shown, and Bob resolves the discrepancy in favor of Home, the one with the double.

FIG. 2.22: A disagreement message is shown, indicating that Bob picked a response to resolve the discrepancy that is different from the choice provided earlier by Alice. Bob realizes he pressed the wrong part of the screen (in FIG. 2.21), selecting his own version which he knows was wrong. He now clicks "Record Response Again" so he can get past this screen and record his response again.

FIG. 2.23: The discrepancy detail is shown again (as in FIG. 2.21). This time Bob carefully selects the correct version of the game event description, which is the other scorekeeper Alice's recording of a "single" for the play.

FIG. 2.24: A discrepancy list is shown again (Bob clicking on the discrepancy inspection area) and sees that there is only 1 remaining item—the $2^{nd}$ plate appearance. He selects this remaining item.

FIG. 2.25: A list of recordings by Bob and Alice for the $2^{nd}$ plate appearance are shown. Bob sees the discrepancy between the called and swinging strike, and selects his own home version, because he remembers how he asked the umpire if the batter checked his swing in time, and the umpire responded that the strike was "on the swing." It turns out the other scorekeeper Alice agreed so this discrepancy is resolved successfully.

FIG. 2.26: Bob returns to main screen view. At this time all discrepancies have been resolved (no more number in the upper right corner), and this made changes to the game state, as compared with FIG. 2.5 The runner is now on first base instead of second, and the number of pitches has been increased from 7 to 8.

FIG. 2.27 is screenshot of Away scorekeeper Alice (α). Returning to the main field view on Alice's mobile computing device Da, no indication of discrepancies is present, and the game state displayed on the screen is now identical to what is displayed on Bob's screen shown in FIG. 2.26.

It is understood that there can be more than two scorekeepers for any given game, in which case the system and associated methods work in a similar fashion such that discrepancy detection is performed on recordings entered by each of the scorekeepers, and only when all recordings on a game event agree with one another, no discrepancy is deemed. Otherwise, the discrepancy resolution mechanism can proceed to allow each of the scorekeepers to respond to, "vote" on, or otherwise rewrite a correct or acceptable version of the event until such discrepancy is resolved among all scorekeepers.

It is also noted that the 2 column (or multiple column) format of showing the discrepancies is just one way of implementing an aspect of the invention. The discrepancies can be shown in a variety of different ways. In addition, to receive responses from scorekeepers, the scorekeepers can be given extra options other than choosing his own previous entry versus another scorekeeper's entry. For example, in alternative embodiments, the scorekeepers can choose column 1, column 2, or "other"—which would enable the scorekeeper to reconstruct the play according to something else entirely. This would help when there are multiple discrepancies within a plate appearance, and the 2 scorekeepers discuss and realize the play should have been scored differently than either of them.

In some of the examples illustrated herein, a remote server (or simply a server) is included that is connected to and in communication with the scorekeepers' personal computing devices to perform certain functions, e.g., receiving recordings from the scorekeepers, carrying out discrepancy resolution logic operations to detect discrepancies, sending out discrepancy reports to scorekeepers, receiving responses from scorekeepers regarding their proposals to resolve discrepancies, etc., in alternative embodiments such a remote server need not be physically present, and the described server functions can be implemented on any one of the personal computing devices as a software module or simulator which directly communicates with the client mobile App installed on the same device (the "hosting" device). Other personal computing devices with client mobile App installed can communicate with the hosting device through either a data network or directly by Bluetooth or other local communication protocols. This would be useful for when an internet connection is not available. In other embodiments, several scorekeepers may share one personal computing device or terminal, each scorekeeper operating on a separate instance of the scorekeeping App (each instance acting independently as if on a separate computing device).

Figure 4:
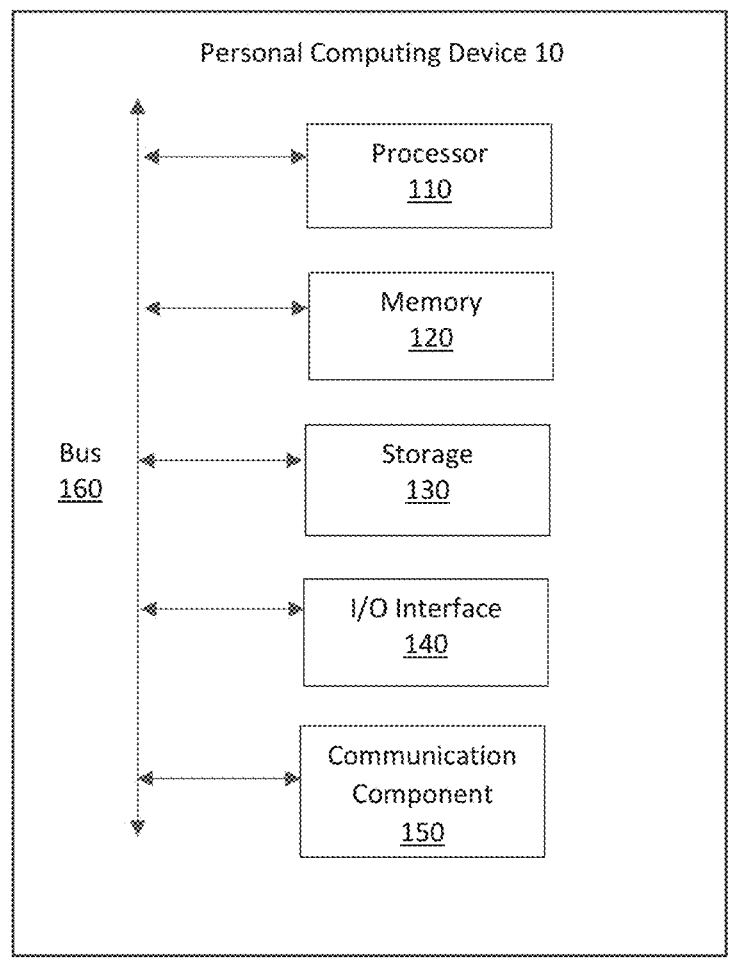
FIG. 4 is a schematic representation of architecture of a personal computing device according to some embodiments of the present disclosure.

As shown in FIG. 4, in some embodiments, a personal computing device 10 of the present disclosure includes a processor 110, memory 120, storage 130, an input/output (I/O) interface 140, a communication component 150, and a bus 160. The server computer can have a same or substantially similar architecture. Although this disclosure describes and illustrates a particular mobile device having a particular number of particular components in a particular arrangement, this disclosure contemplates any suitable mobile device having any suitable number of any suitable components in any suitable arrangement. The processor can include hardware for executing instructions, such as those making up a computer program or application, for example, it may retrieve (or fetch) the instructions from an internal register, an internal cache, memory, storage; decode and execute them; and then write one or more results to internal register, internal cache, memory, or storage. In particular embodiments, software executed by processor 110 may include an operating system (OS). As an example and not by limitation, if personal computing device 10 is a smartphone, then the OS may be a mobile operating system, such as for example, Android, iOS, Windows. In some embodiments, the memory 120 can include main memory for storing instructions for the processor to execute or data for processor to operate on. One or more buses may connect the processor with the memory. The memory 120 can include random-access memory (RAM). This RAM may be volatile memory, where appropriate. Where appropriate, this RAM may be dynamic RAM (DRAM) or static RAM (SRAM). The storage 130 can include non-volatile and/or non-transient mass storage or media for data or instructions, for example HDD, flash memory, optical medium, DVD, etc., or a combination of two or more thereof, solid-state memory. read-only memory (ROM), or any other suitable physical form. The I/O interface 140 can include hardware, software, or both providing one or more interfaces for communication between the personal computing device and one or more I/O devices, such as keyboard, keypad, one or more sensors, touch screen, microphone, monitor, mouse, printer, scanner, speaker, etc. The communication component 150 can include hardware, software, or both providing one or more interfaces for communication (such as, for example, packet-based communication) between the personal computing device and the server (or other personal computing device(s)), for example, a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such as third generation mobile telecommunications (3G), or Long Term Evolution (LTE) network, wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more thereof. The bus 160 can include hardware, software, or both coupling components of the personal computing device to each other, for example, a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system for resolving discrepancies between score records made by multiple scorekeepers for a baseball game comprising:
    a remote server operably connected to a first personal computing device and a second personal computing device via a data network, the remote server having a server software application installed thereon, which when running, enable the remote server to perform the following:
    receiving a first recording regarding a game event from a predefined list of possible game events from the first personal computing device;
    receiving a second recording regarding the game event from the second electronic device;
    determining if there is a discrepancy between the received first recording and the second recording, and if there is a discrepancy:
        sending a report about the discrepancy to the first personal computing device;
        sending the report to the second personal computing device;
        receive a first response from the first personal computing device regarding a selection between the first recording and the second recording;
        receive a second response from the second personal computing device regarding a selection between the first recording and the second recording; and
        based on a comparison of the first response and the second response, determine whether the discrepancy has been resolved.

2. The system of claim 1, wherein the server software application enables the remote server to send the report about the discrepancy only after a plate appearance of the baseball game is completed.

3. The system of claim 1, wherein the server software application enables the remote server to send the report about the discrepancy immediately upon a positive determination of the discrepancy.

4. A computer-implemented method of resolving discrepancies between game records made by multiple scorekeepers for a game, the method being operable on a system comprising a first personal computing device, a second personal computing device, and a remote server operably connected to a first personal computing device and a second personal computing device, the method comprising:
    the first personal computing device receiving a first recording on a game event from a predefined list of possible game events from a first scorekeeper, the first recording being tagged as requiring immediate resolution;
    the first personal computing device sending the first recording to the remote server via a data network;
    the remote server detecting the status of the first recording as requiring immediate resolution;
    the remote server sending an alert message to a second personal computing device, the message comprising a request for an acceptance of the first recording;
    the second personal computing device presenting the alert message to a UT user interface of the second personal computing device;
    the second personal computing device receiving a response from a second scorekeeper regarding whether the second scorekeeper accepts the first recording;
    the second personal computing device sending the response to the remote server; and
    the remote server determines, based on the received response, whether the first recording is to be accepted as an official recording of the game event.

5. The method of claim 4, wherein if the remote server determines the first recording is to be accepted as the official recording of the game event, the method further comprising:
    the remote server sending a message to each of the first and second personal computing device, the message including instructions to store the first recording as an official recording of the game event.

6. The method of claim 4, wherein the game event is a proposed game event.

* * * * *